US012688845B2

(12) United States Patent
Vondersaar et al.

(10) Patent No.: US 12,688,845 B2
(45) Date of Patent: Jul. 21, 2026

(54) MICROPHONE ARRAY GEOMETRY

(71) Applicant: Magic Leap, Inc., Plantation, FL (US)

(72) Inventors: Benjamin Thomas Vondersaar, Indianapolis, IN (US); Jean-Marc Jot, Aptos, CA (US); David Thomas Roach, Plantation, FL (US); Mathieu Parvaix, Santa Clara, CA (US)

(73) Assignee: MAGIC LEAP, INC., Plantation, FL (US)

( * ) Notice: Subject to any disclaimer, the term of this patent is extended or adjusted under 35 U.S.C. 154(b) by 145 days.

(21) Appl. No.: 18/700,170

(22) PCT Filed: Oct. 13, 2022

(86) PCT No.: PCT/US2022/078073
§ 371 (c)(1),
(2) Date: Apr. 10, 2024

(87) PCT Pub. No.: WO2023/064875
PCT Pub. Date: Apr. 20, 2023

(65) Prior Publication Data

US 2025/0225971 A1 Jul. 10, 2025

Related U.S. Application Data

(60) Provisional application No. 63/255,882, filed on Oct. 14, 2021.

(51) Int. Cl.
*G10L 21/0232* (2013.01)
*G10K 11/178* (2006.01)
(Continued)

(52) U.S. Cl.
CPC .. *G10K 11/17823* (2018.01); *G10K 11/17881* (2018.01); *H04R 1/1083* (2013.01);
(Continued)

(58) Field of Classification Search
CPC .......... G10K 11/17823; G10K 11/341; G10K 11/17881; G10K 11/17821;
(Continued)

(56) References Cited

U.S. PATENT DOCUMENTS 4,158,750 A 6/1979 Sakoe
4,852,988 A 8/1989 Velez
(Continued)

FOREIGN PATENT DOCUMENTS

CA 2316473 A1 1/2001
CA 2362895 A1 12/2002
(Continued)

OTHER PUBLICATIONS

Chinese Notice of Allowance dated Feb. 18, 2025, for CN Application No. 202080044362.4, with English translation, 7 pages.
(Continued)

*Primary Examiner* — Md S Elahee
(74) *Attorney, Agent, or Firm* — KLINTWORTH & ROZENBLAT LLP

(57) ABSTRACT

This disclosure relates in general to microphone arrangement of a wearable head device.

18 Claims, 17 Drawing Sheets

(51) Int. Cl.
*H04R 1/10* (2006.01)
*H04R 1/40* (2006.01)
*H04R 3/00* (2006.01)

(52) U.S. Cl.
CPC ............. *H04R 1/406* (2013.01); *H04R 3/005* (2013.01); *G10K 2210/3215* (2013.01); *H04R 2410/01* (2013.01); *H04R 2460/01* (2013.01); *H04R 2499/15* (2013.01)

(58) Field of Classification Search
CPC .......... G10K 2210/3215; H04R 1/1083; H04R 3/005; H04R 5/033; H04R 1/406; H04R 2460/01; H04R 2499/15; H04R 2410/01; G10L 2021/02166; G10L 25/78; G10L 21/0208; H04S 2400/11; H04S 2400/15; H04S 7/304
USPC ........................................................ 381/71.1
See application file for complete search history.

(56) References Cited

U.S. PATENT DOCUMENTS

| | | | |
|---|---|---|---|
| 5,627,899 | A | 5/1997 | Craven et al. |
| 6,433,760 | B1 | 8/2002 | Vaissie |
| 6,491,391 | B1 | 12/2002 | Blum et al. |
| 6,496,799 | B1 | 12/2002 | Pickering |
| 6,738,482 | B1 | 5/2004 | Jaber |
| 6,820,056 | B1 | 11/2004 | Harif |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,346,654 | B1 | 3/2008 | Weiss |
| 7,347,551 | B2 | 3/2008 | Fergason et al. |
| 7,488,294 | B2 | 2/2009 | Torch |
| 7,587,319 | B2 | 9/2009 | Catchpole |
| 7,979,277 | B2 | 7/2011 | Larri et al. |
| 8,154,588 | B2 | 4/2012 | Burns |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,294,860 | B1 | 3/2016 | Carlson |
| 9,323,325 | B2 | 4/2016 | Perez et al. |
| 9,715,875 | B2 | 7/2017 | Piernot |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,062,377 | B2 | 8/2018 | Larri et al. |
| 10,134,425 | B1 | 11/2018 | Johnson, Jr. |
| 10,289,205 | B1 | 5/2019 | Sumter |
| 10,839,789 | B2 | 11/2020 | Larri et al. |
| 10,971,140 | B2 | 4/2021 | Catchpole |
| 11,151,997 | B2 | 10/2021 | Sugiyama et al. |
| 11,328,740 | B2 | 5/2022 | Lee et al. |
| 11,587,563 | B2 | 2/2023 | Sheeder et al. |
| 11,699,454 | B1 * | 7/2023 | D Souza ................ H04R 3/005 381/71.1 |
| 11,790,935 | B2 | 10/2023 | Lee et al. |
| 11,854,550 | B2 | 12/2023 | Sheeder |
| 11,854,566 | B2 | 12/2023 | Leider |
| 11,917,384 | B2 | 2/2024 | Roach |
| 12,094,489 | B2 | 9/2024 | Lee |
| 12,238,496 | B2 | 2/2025 | Roach et al. |
| 12,243,531 | B2 | 3/2025 | Sheeder et al. |
| 2001/0055985 | A1 | 12/2001 | Matt et al. |
| 2003/0030597 | A1 | 2/2003 | Geist |
| 2005/0033571 | A1 | 2/2005 | Huang |
| 2005/0069852 | A1 | 3/2005 | Janakiraman et al. |
| 2006/0023158 | A1 | 2/2006 | Howell et al. |
| 2006/0072767 | A1 | 4/2006 | Zhang et al. |
| 2006/0098827 | A1 | 5/2006 | Paddock et al. |
| 2006/0178876 | A1 | 8/2006 | Sato et al. |
| 2007/0225982 | A1 | 9/2007 | Washio |
| 2008/0124690 | A1 | 5/2008 | Redlich |
| 2008/0201138 | A1 | 8/2008 | Visser et al. |
| 2009/0180626 | A1 | 7/2009 | Nakano |
| 2010/0245585 | A1 | 9/2010 | Fisher et al. |
| 2010/0323652 | A1 | 12/2010 | Visser et al. |
| 2011/0211056 | A1 | 9/2011 | Publicover et al. |
| 2011/0213664 | A1 | 9/2011 | Osterhout |
| 2011/0238407 | A1 | 9/2011 | Kent |
| 2011/0288860 | A1 | 11/2011 | Schevciw et al. |
| 2012/0021806 | A1 | 1/2012 | Maltz |
| 2012/0130713 | A1 | 5/2012 | Shin et al. |
| 2012/0209601 | A1 | 8/2012 | Jing |
| 2013/0077147 | A1 | 3/2013 | Efimov |
| 2013/0204607 | A1 | 8/2013 | Baker, IV |
| 2013/0226589 | A1 | 8/2013 | Largey |
| 2013/0236040 | A1 | 9/2013 | Crawford |
| 2013/0339028 | A1 | 12/2013 | Rosner et al. |
| 2014/0016793 | A1 | 1/2014 | Gardner |
| 2014/0194702 | A1 | 7/2014 | Tran |
| 2014/0195918 | A1 | 7/2014 | Friedlander |
| 2014/0200887 | A1 | 7/2014 | Nakadai et al. |
| 2014/0222430 | A1 | 8/2014 | Rao |
| 2014/0270202 | A1 | 9/2014 | Ivanov et al. |
| 2014/0270244 | A1 | 9/2014 | Fan |
| 2014/0310595 | A1 | 10/2014 | Acharya et al. |
| 2014/0337023 | A1 | 11/2014 | Mcculloch et al. |
| 2014/0379336 | A1 | 12/2014 | Bhatnagar |
| 2015/0006181 | A1 | 1/2015 | Fan et al. |
| 2015/0168731 | A1 | 6/2015 | Robbins |
| 2015/0310857 | A1 | 10/2015 | Habets et al. |
| 2015/0348572 | A1 | 12/2015 | Thornburg et al. |
| 2016/0019910 | A1 | 1/2016 | Faubel et al. |
| 2016/0066113 | A1 | 3/2016 | Elkhatib et al. |
| 2016/0112817 | A1 | 4/2016 | Fan et al. |
| 2016/0142830 | A1 | 5/2016 | Hu |
| 2016/0165340 | A1 | 6/2016 | Benattar |
| 2016/0180837 | A1 | 6/2016 | Gustavsson |
| 2016/0216130 | A1 | 7/2016 | Abramson et al. |
| 2016/0217781 | A1 | 7/2016 | Zhong et al. |
| 2016/0284350 | A1 | 9/2016 | Yun et al. |
| 2016/0358598 | A1 | 12/2016 | Williams et al. |
| 2016/0379629 | A1 | 12/2016 | Hofer et al. |
| 2016/0379632 | A1 | 12/2016 | Hoffmeister et al. |
| 2016/0379638 | A1 | 12/2016 | Basye et al. |
| 2017/0078819 | A1 | 3/2017 | Habets |
| 2017/0091169 | A1 | 3/2017 | Bellegarda |
| 2017/0092276 | A1 | 3/2017 | Sun et al. |
| 2017/0110116 | A1 | 4/2017 | Tadpatrikar et al. |
| 2017/0148429 | A1 | 5/2017 | Hayakawa |
| 2017/0270919 | A1 | 9/2017 | Parthasarathi et al. |
| 2017/0280239 | A1 | 9/2017 | Sekiya |
| 2017/0316780 | A1 | 11/2017 | Lovitt |
| 2017/0330555 | A1 | 11/2017 | Kawano |
| 2017/0332187 | A1 | 11/2017 | Lin |
| 2018/0011534 | A1 | 1/2018 | Poulos et al. |
| 2018/0053284 | A1 | 2/2018 | Rodriguez et al. |
| 2018/0077095 | A1 | 3/2018 | Deyle et al. |
| 2018/0129469 | A1 | 5/2018 | Vennström et al. |
| 2018/0227665 | A1 | 8/2018 | Elko et al. |
| 2018/0316939 | A1 | 11/2018 | Todd |
| 2018/0336902 | A1 | 11/2018 | Cartwright et al. |
| 2018/0349946 | A1 | 12/2018 | Nguyen |
| 2018/0358021 | A1 | 12/2018 | Mistica et al. |
| 2018/0366114 | A1 | 12/2018 | Anbazhagan et al. |
| 2019/0129944 | A1 | 5/2019 | Kawano |
| 2019/0362704 | A1 | 11/2019 | Nicolis et al. |
| 2019/0362741 | A1 | 11/2019 | Li et al. |
| 2019/0373362 | A1 | 12/2019 | Ansai et al. |
| 2019/0392641 | A1 | 12/2019 | Taylor |
| 2020/0027455 | A1 | 1/2020 | Sugiyama et al. |
| 2020/0064921 | A1 | 2/2020 | Kang et al. |
| 2020/0194028 | A1 | 6/2020 | Lipman |
| 2020/0213729 | A1 | 7/2020 | Soto |
| 2020/0279552 | A1 | 9/2020 | Piersol et al. |
| 2020/0286465 | A1 | 9/2020 | Wang et al. |
| 2020/0296521 | A1 | 9/2020 | Wexler et al. |

(56) References Cited

U.S. PATENT DOCUMENTS

| | | | |
|---|---|---|---|
| 2020/0335128 | A1 | 10/2020 | Sheeder et al. |
| 2021/0056966 | A1 | 2/2021 | Bilac et al. |
| 2021/0125609 | A1 | 4/2021 | Dusan et al. |
| 2021/0192413 | A1 | 6/2021 | Shirazipour |
| 2021/0306751 | A1 | 9/2021 | Roach et al. |
| 2023/0386461 | A1 | 11/2023 | Leider |
| 2023/0410835 | A1 | 12/2023 | Lee |
| 2024/0087565 | A1 | 3/2024 | Sheeder |
| 2024/0087587 | A1 | 3/2024 | Leider |
| 2024/0163612 | A1 | 5/2024 | Roach |
| 2024/0420718 | A1 | 12/2024 | Audfray |
| 2025/0006219 | A1 | 1/2025 | Lee |

FOREIGN PATENT DOCUMENTS

| | | | |
|---|---|---|---|
| CA | 2388766 | A1 | 12/2003 |
| CN | 105529033 | A | 4/2016 |
| EP | 2950307 | A1 | 12/2015 |
| EP | 3211918 | A1 | 8/2017 |
| JP | S52144205 | A | 12/1977 |
| JP | 06075588 | A | 3/1994 |
| JP | 2000148184 | A | 5/2000 |
| JP | 2000261534 | A | 9/2000 |
| JP | 2002135173 | A | 5/2002 |
| JP | 2003264883 | A | 9/2003 |
| JP | 2005196134 | A | 7/2005 |
| JP | 2005260744 | A * | 9/2005 |
| JP | 2008242067 | A | 10/2008 |
| JP | 2010273305 | A | 12/2010 |
| JP | 2013183358 | A | 9/2013 |
| JP | 2014137405 | A | 7/2014 |
| JP | 2014178339 | A | 9/2014 |
| JP | 2016004270 | A | 1/2016 |
| JP | 2017211596 | A | 11/2017 |
| JP | 2018523156 | A | 8/2018 |
| JP | 2018179954 | A | 11/2018 |
| WO | 2014113891 | A1 | 7/2014 |
| WO | 2014159581 | A1 | 10/2014 |
| WO | 2015169618 | A1 | 11/2015 |
| WO | 2016063587 | A1 | 4/2016 |
| WO | 2016151956 | A1 | 9/2016 |
| WO | 2016153712 | A1 | 9/2016 |
| WO | 2017003903 | A1 | 1/2017 |
| WO | 2017017591 | A1 | 2/2017 |
| WO | 2017191711 | A1 | 11/2017 |
| WO | 2018163648 | A1 | 9/2018 |
| WO | 2019224292 | A1 | 11/2019 |
| WO | 2020180719 | A1 | 9/2020 |
| WO | 2020214844 | A1 | 10/2020 |
| WO | WO 2021048632 | A2 | 3/2021 |
| WO | 2022072752 | A1 | 4/2022 |
| WO | 2023064875 | A1 | 4/2023 |

OTHER PUBLICATIONS

European Search Report dated Jan. 20, 2025, for EP Application No. 24221982.2 nine pages.
Kaushik, Mayank, et al. "Three Dimensional Microphone and Source Position Estimation Using TDOA and TOF Measurements." 2011 IEEE International Conference on Signal Processing, Communications and Computing (Icspcc). IEEE, 2011. (Year: 2011).
Non-Final Office Action mailed Jan. 24, 2025, for U.S. Appl. No. 18/510,376, filed Nov. 15, 2023, seventeen pages.
Non-Final Office Action mailed Mar. 4, 2025, for U.S. Appl. No. 18/029,355, filed Mar. 29, 2023, ten pages.
Notice of Allowance mailed Dec. 11, 2024, for U.S. Appl. No. 18/418,131, filed Jan. 19, 2024, seven pages.
Notice of Allowance mailed Dec. 19, 2024, for U.S. Appl. No. 18/506,866, filed Nov. 10, 2023, five pages.
European Notice of Allowance dated Jul. 15, 2024, for EP Application No. 20791183.5 nine pages.
Final Office Action mailed Jul. 17, 2024, for U.S. Appl. No. 16/850,965, filed Apr. 16, 2020, seventeen pages.
Japanese Notice of Allowance mailed Aug. 21, 2024, for JP Application No. 2021-562002, with English translation, 6 pages.
Japanese Notice of Allowance mailed Oct. 28, 2024, for JP Application No. 2021-551538 with English translation, 6 pages.
Non-Final Office Action mailed Aug. 26, 2024, for U.S. Appl. No. 18/418,131, filed Jan. 19, 2024, ten pages.
Non-Final Office Action mailed Aug. 26, 2024, for U.S. Appl. No. 18/506,866, filed Nov. 10, 2023, twelve pages.
Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
Bilac, M. et al. (Nov. 15, 2017). Gaze and Filled Pause Detection for Smooth Human-Robot Conversations. www.angelicalim.com , retrieved on Jun. 17, 2020, Retrieved from the internet URL: http://www.angelicalim.com/papers/humanoids2017_paper.pdf entire document, 8 pages. (20.40).
Chinese Office Action dated Dec. 21, 2023, for CN Application No. 201980050714.4, with English translation, eighteen pages.
European Office Action dated Dec. 12, 2023, for EP Application No. 20766540.7, four pages.
European Office Action dated Jun. 1, 2023, for EP Application No. 19822754.8, six pages.
European Search Report dated Nov. 12, 2021, for EP Application No. 19822754.8, ten pages.
European Search Report dated Nov. 21, 2022, for EP Application No. 20791183.5 nine pages.
European Search Report dated Oct. 6, 2022, for EP Application No. 20766540.7 nine pages.
Final Office Action mailed Apr. 10, 2023, for U.S. Appl. No. 16/850,965, filed Apr. 16, 2020, sixteen pages.
Final Office Action mailed Apr. 15, 2022, for U.S. Appl. No. 16/850,965, filed Apr. 16, 2020, fourteen pages.
Final Office Action mailed Aug. 4, 2023, for U.S. Appl. No. 17/254,832, filed Dec. 21, 2020, seventeen pages.
Final Office Action mailed Aug. 5, 2022, for U.S. Appl. No. 16/805,337, filed Feb. 28, 2020, eighteen pages.
Final Office Action mailed Jan. 11, 2023, for U.S. Appl. No. 17/214,446, filed Mar. 26, 2021, sixteen pages.
Final Office Action mailed Jan. 23, 2024, for U.S. Appl. No. 16/850,965, filed Apr. 16, 2020, fifteen pages.
Final Office Action mailed Oct. 6, 2021, for U.S. Appl. No. 16/805,337, filed Feb. 28, 2020, fourteen pages.
Final Office Action mailed Sep. 7, 2023, for U.S. Appl. No. 17/214,446, filed Mar. 26, 2021, nineteen pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.
International Preliminary Report and Patentability mailed Dec. 22, 2020, for PCT Application No. PCT/US2019/038546, 13 pages.
International Preliminary Report and Written Opinion mailed Apr. 13, 2023, for PCT Application No. PCT/US2021/53046, filed Sep. 30, 2021, nine pages.
International Preliminary Report and Written Opinion mailed Apr. 25, 2024, for PCT Application No. PCT/US2022/078063, seven pages.
International Preliminary Report and Written Opinion mailed Oct. 28, 2021, for PCT Application No. PCT/US2020/028570, filed Apr. 16, 2020, 17 pages.
International Preliminary Report and Written Opinion mailed Sep. 16, 2021, for PCT Application No. PCT/US20/20469, filed Feb. 28, 2020, nine pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.

(56) References Cited

OTHER PUBLICATIONS

International Search Report and Written Opinion mailed Jan. 11, 2023, for PCT Application No. PCT/US2022/078298, seventeen pages.
International Search Report and Written Opinion mailed Jan. 24, 2022, for PCT Application No. PCT/US2021/53046, filed Sep. 30, 2021, fifteen pages.
International Search Report and Written Opinion mailed Jan. 25, 2023, for PCT Application No. PCT/US2022/078063, nineteen pages.
International Search Report and Written Opinion mailed Jul. 2, 2020, for PCT Application No. PCT/US2020/028570, filed Apr. 16, 2020, nineteen pages.
International Search Report and Written Opinion mailed May 18, 2020, for PCT Application No. PCT/US20/20469, filed Feb. 28, 2020, twenty pages.
International Search Report and Written Opinion mailed Sep. 17, 2019, for PCT Application No. PCT/US2019/038546, sixteen pages.
Jacob, R. "Eye Tracking in Advanced Interface Design", Virtual Environments and Advanced Interface Design, Oxford University Press, Inc. (Jun. 1995).
Japanese Final Office Action mailed May 31, 2024, for JP Application No. 2021-551538, with English translation, eighteen pages.
Japanese Notice of Allowance mailed Dec. 15, 2023, for JP Application No. 2020571488, with English translation, eight pages.
Japanese Office Action dated Jun. 2, 2023, for JP Application No. 2020 571488, with English translation, 9 pages.
Japanese Office Action mailed Jan. 30, 2024, for JP Application No. 2021-551538, with English translation, sixteen pages.
Japanese Office Action mailed May 2, 2024, for JP Application No. 2021-562002, with English translation, sixteen pages.
Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download?doi=10 .1.1.141.1472 &rep=rep1&type=pdf entire document, pp. 1237-1240.
Liu, Baiyang, et al.: (Sep. 6, 2015). "Accurate Endpointing with Expected Pause Duration," INTERSPEECH 2015, pp. 2912-2916, retrieved from: a href="https://scholar.google.com/scholar?q= BAIYANG"target="_blank"https://scholar.google.com/scholar?q= BAIYANG/a,+Liu+et+al.:+(September+6,+2015).+Accurate+endpointing+with+expected+pause+duration,&hl=en&as_sdt=0&as_vis= 1&oi=scholart.
Non-Final Office Action mailed Apr. 12, 2023, for U.S. Appl. No. 17/214,446, filed Mar. 26, 2021, seventeen pages.
Non-Final Office Action mailed Apr. 13, 2023, for U.S. Appl. No. 17/714,708, filed Apr. 6, 2022, sixteen pages.
Non-Final Office Action mailed Apr. 27, 2023, for U.S. Appl. No. 17/254,832, filed Dec. 21, 2020, fourteen pages.
Non-Final Office Action mailed Aug. 10, 2022, for U.S. Appl. No. 17/214,446, filed Mar. 26, 2021, fifteen pages.
Non-Final Office Action mailed Jun. 23, 2023, for U.S. Appl. No. 18/148,221, filed Dec. 29, 2022, thirteen pages.
Non-Final Office Action mailed Jun. 24, 2021, for U.S. Appl. No. 16/805,337, filed Feb. 28, 2020, fourteen pages.
Non-Final Office Action mailed Mar. 17, 2022, for U.S. Appl. No. 16/805,337, filed Feb. 28, 2020, sixteen pages.
Non-Final Office Action mailed Mar. 27, 2024, for U.S. Appl. No. 16/850,965, filed Apr. 16, 2020, sixteen pages.
Non-Final Office Action mailed Nov. 17, 2021, for U.S. Appl. No. 16/987,267, filed Aug. 6, 2020, 21 pages.
Non-Final Office Action mailed Oct. 4, 2021, for U.S. Appl. No. 16/850,965, filed Apr. 16, 2020, twelve pages.
Non-Final Office Action mailed Sep. 15, 2023, for U.S. Appl. No. 16/850,965, filed Apr. 16, 2020, fourteen pages.
Non-Final Office Action mailed Sep. 29, 2022, for U.S. Appl. No. 16/850,965, filed Apr. 16, 2020, fifteen pages.
Notice of Allowance mailed Dec. 15, 2023, for U.S. Appl. No. 17/214,446, filed Mar. 26, 2021, seven pages.
Notice of Allowance mailed Jul. 31, 2023, for U.S. Appl. No. 17/714,708, filed Apr. 6, 2022, eight pages.
Notice of Allowance mailed Jun. 5, 2024, for U.S. Appl. No. 18/459,342, filed Aug. 31, 2023, eight pages.
Notice of Allowance mailed Mar. 3, 2022, for U.S. Appl. No. 16/987,267, filed Aug. 6, 2020, nine pages.
Notice of Allowance mailed Nov. 30, 2022, for U.S. Appl. No. 16/805,337, filed Feb. 28, 2020, six pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.
Rolland, J. et al., "High-resolution inset head-mounted display", Optical Society of America, vol. 37, No. 19, Applied Optics, (Jul. 1, 1998).
Shannon, Matt et al. (Aug. 20-24, 2017). "Improved End-of-Query Detection for Streaming Speech Recognition", INTERSPEECH 2017, Stockholm, Sweden, pp. 1909-1913.
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf 100 pages.
Yoshida, A. et al., "Design and Applications of a High Resolution Insert Head Mounted Display", (Jun. 1994).
Chinese Office Action dated Feb. 12, 2025, for CN Application No. 202080031993.2, with English translation, 18 pages.
Japanese Office Action mailed Apr. 16, 2025, for JP Application No. 2023-142856, with English translation, 6 pages.
Notice of Allowance (corrected) mailed May 7, 2025, for U.S. Appl. No. 16/850,965, filed Apr. 16, 2020, seven pages.
Notice of Allowance mailed Apr. 2, 2025, for U.S. Appl. No. 16/850,965, filed Apr. 16, 2020, ten pages.
Notice of Allowance mailed Apr. 25, 2025, for U.S. Appl. No. 18/510,376, filed Nov. 15, 2023, eight pages.
Chinese Notice of Allowance dated Nov. 7, 2024, for CN Application No. 201980050714.4, with English translation, 6 pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.
Japanese Office Action mailed Nov. 7, 2024, for JP Application No. 2023-142856, with English translation, 12 pages.
Non-Final Office Action mailed Nov. 6, 2024, for U.S. Appl. No. 16/850,965, filed Apr. 16, 2020, twenty pages.
Extended European Search Report including the Supplementary European Search Report issued in application No. 1 22882025.4 mail date Jul. 22, 2025.

* cited by examiner

MICROPHONE ARRAY GEOMETRY

CROSS REFERENCE TO RELATED APPLICATIONS

This application is a U.S. national stage application under 35 U.S.C. § 371 of International Application No. PCT/US2022/078073, filed internationally on Oct. 13, 2022, which claims priority to U.S. Provisional Application No. 63/255,882, filed on Oct. 14, 2021, the contents of which are incorporated by reference herein in their entirety.

FIELD

This disclosure relates in general to microphone arrangement of a wearable head device.

BACKGROUND

Symmetrical microphone configurations can offer several advantages in detecting voice onset events. Because a symmetrical microphone configuration may place two or more microphones equidistant from a sound source (e.g., a user's mouth), audio signals received from each microphone may be easily added and/or subtracted from each other for signal processing.

However, it may be more difficult for symmetric microphone configurations to distinguish a user's voice from other audio signals. For example, a person standing directly in front of a user may not be distinguishable from the user with a symmetrical microphone configuration on a wearable head device. A symmetrical microphone configuration may result in both microphones receiving speech signals at the same time, regardless of whether the user was speaking or if the person directly in front of the user is speaking. This may allow the person directly in front of the user to "hijack" a MR system by issuing voice commands that the MR system may not be able to determine as originating from someone other than the user.

Furthermore, due to the symmetric configuration, it may be more difficult to capture sound information along an axis of symmetry (e.g., symmetric microphones are at a same level on the axis of symmetry, the symmetric microphones are co-planar). This difficulty would in turn cause user voice isolation, acoustic cancellation, audio scene analysis, fixed-orientation environment capture, and lobe steering to become more challenging because sound information along all axis of an environment may be required. A solution to improve accuracy is to include additional microphones along the axis of symmetry to capture more information along the axis. However, adding microphones would result in increased weight and power consumption, which may not be desirable for battery-powered device worn by a user, such as a wearable head device.

BRIEF SUMMARY

Examples of the disclosure describe systems and methods related to microphone arrangement of a wearable head device.

In some embodiments, a wearable head device comprises: a first plurality of microphones, wherein the first plurality of microphones are co-planar; a second microphone, wherein the second microphone is not co-planar with the plurality of microphones; and one or more processors configured to perform: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

In some embodiments, a number of the first plurality of microphones is three.

In some embodiments, the beamforming pattern comprises a radial component, an azimuthal angle component, and a non-zero polar angle component.

In some embodiments, the beamforming pattern comprises at least one of cardioid, hypercardioid, supercardioid, dipole, bipolar, and shotgun shapes.

In some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

In some embodiments, the one or more processors are configured to further perform preconditioning the signal of the captured sound.

In some embodiments, one of the first plurality of microphones and the second microphone are located on a front of the wearable head device.

In some embodiments, the beamforming pattern does not include a location of a second sound on a plane co-planar with the first plurality of microphones.

In some embodiments, a microphone of the first plurality of microphones is located proximal to an ear location.

In some embodiments, the one or more processors are configured to further perform: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

In some embodiments, a method of operating a wearable head device comprising: a first plurality of microphones, wherein the first plurality of microphones are co-planar; and a second microphone, wherein the second microphone is not co-planar with the plurality of microphones, the method comprising: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

In some embodiments, a number of the first plurality of microphones is three.

In some embodiments, the beamforming pattern comprises a radial component, an azimuthal angle component, and a non-zero polar angle component.

In some embodiments, the beamforming pattern comprises at least one of cardioid, hypercardioid, supercardioid, dipole, bipolar, and shotgun shapes.

In some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

In some embodiments, the method further comprises performing preconditioning the signal of the captured sound.

In some embodiments, one of the first plurality of microphones and the second microphone are located on a front of the wearable head device.

In some embodiments, the beamforming pattern does not include a location of a second sound on a plane co-planar with the first plurality of microphones.

In some embodiments, a microphone of the first plurality of microphones is located proximal to an ear location.

In some embodiments, the method further comprises: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

In some embodiments, a non-transitory computer-readable medium storing one or more instructions, which, when executed by one or more processors of an electronic device comprising: a first plurality of microphones, wherein the first plurality of microphones are co-planar; and a second microphone, wherein the second microphone is not co-planar with the plurality of microphones, cause the device to perform a method comprising: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

In some embodiments, a number of the first plurality of microphones is three.

In some embodiments, the beamforming pattern comprises a radial component, an azimuthal angle component, and a non-zero polar angle component.

In some embodiments, the beamforming pattern comprises at least one of cardioid, hypercardioid, supercardioid, dipole, bipolar, and shotgun shapes.

In some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

In some embodiments, the method further comprises performing preconditioning the signal of the captured sound.

In some embodiments, one of the first plurality of microphones and the second microphone are located on a front of the wearable head device.

In some embodiments, the beamforming pattern does not include a location of a second sound on a plane co-planar with the first plurality of microphones.

In some embodiments, a microphone of the first plurality of microphones is located proximal to an ear location.

In some embodiments, the method further comprises: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

DETAILED DESCRIPTION

Figure 1A:
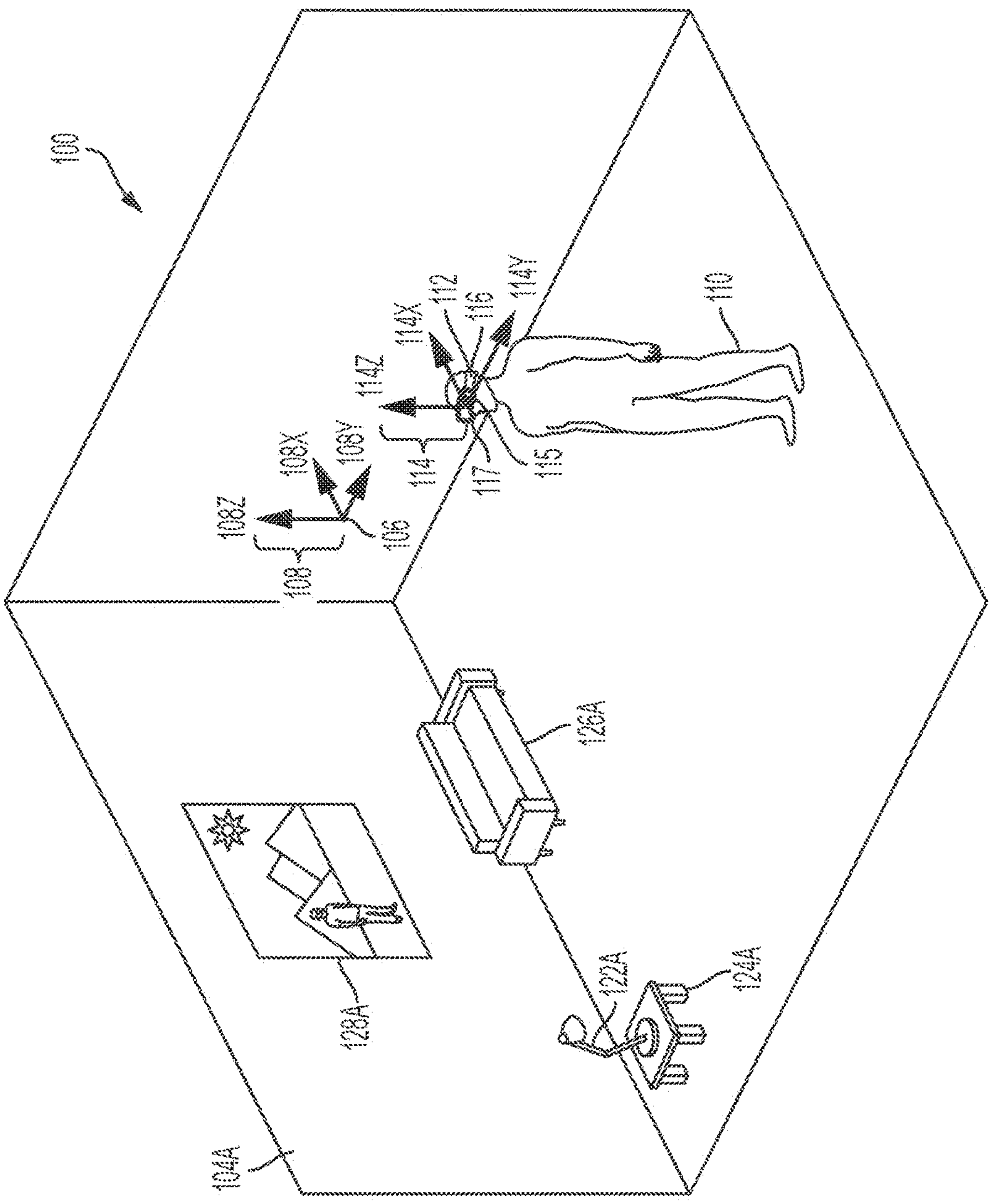
FIGS. 1A-1C illustrate example environments according to some embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a MR system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space.

A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate (e.g., using the methods and systems described herein)—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A MR system can present to the user, for example using a transmissive display and/or one or more speakers (which may, for example, be incorporated into a wearable head device), a MR environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects may have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user). Presentation of virtual characters or objects having life-like audio responses is described in more detail herein.

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
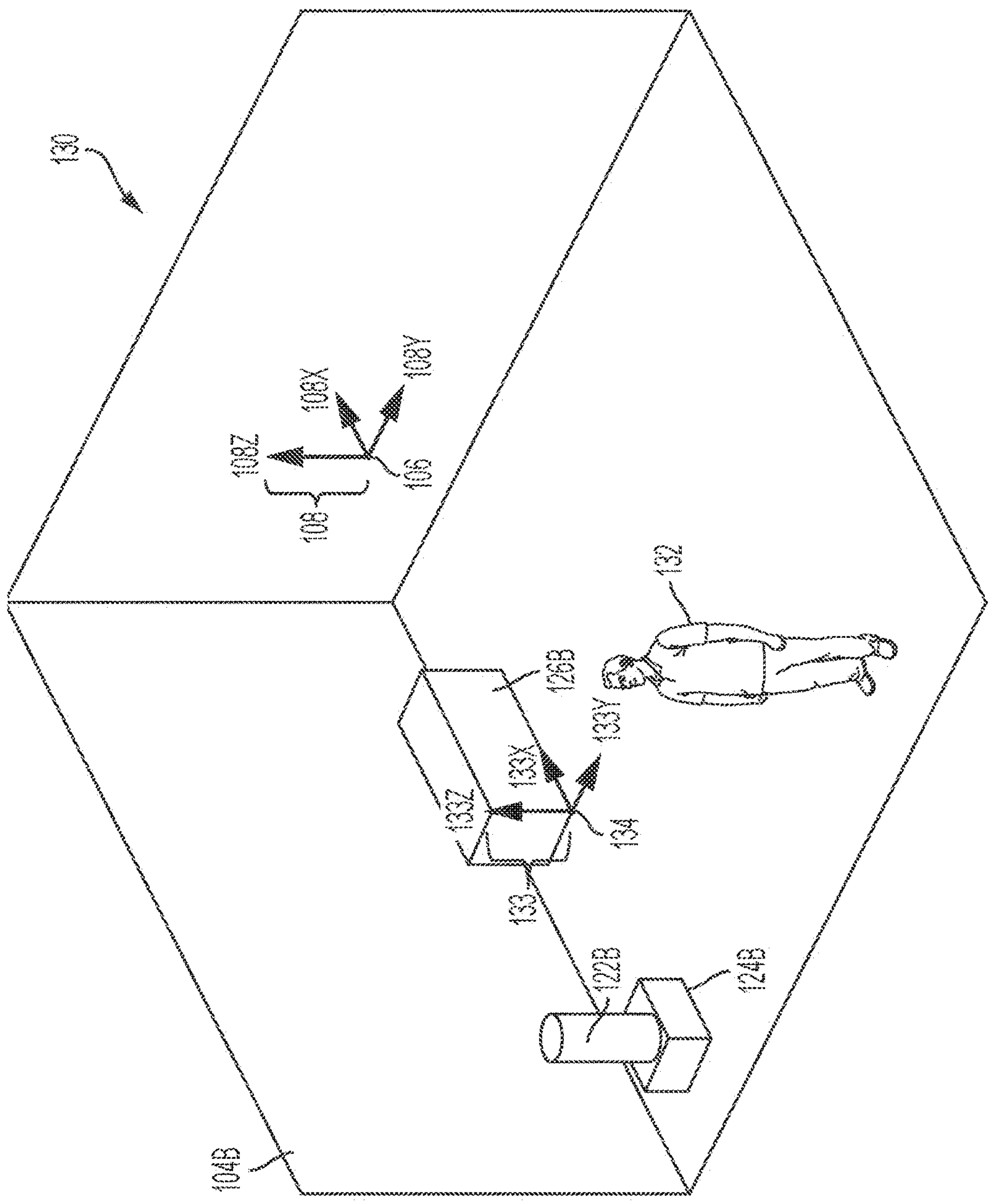

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
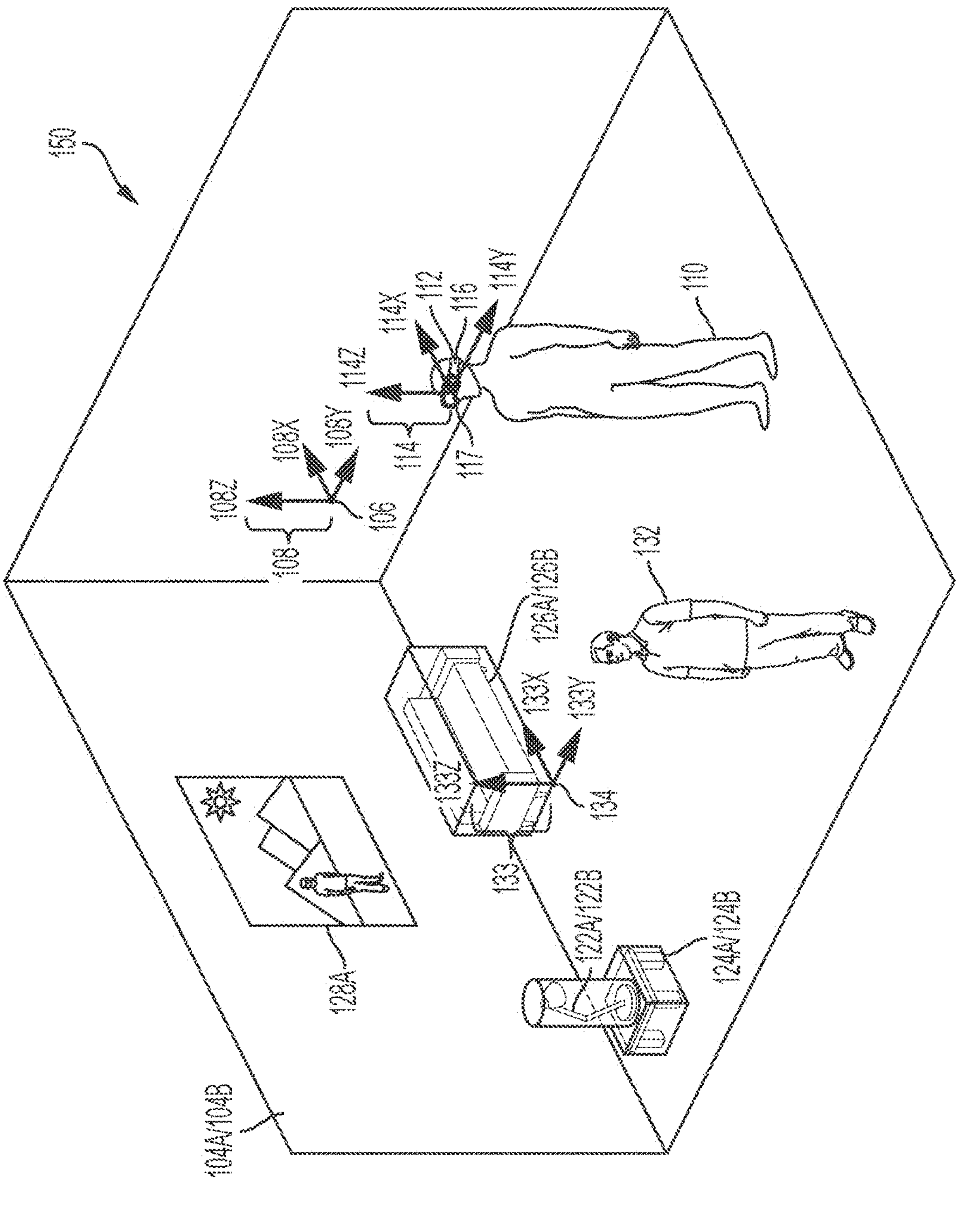

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150.

Figure 2A:
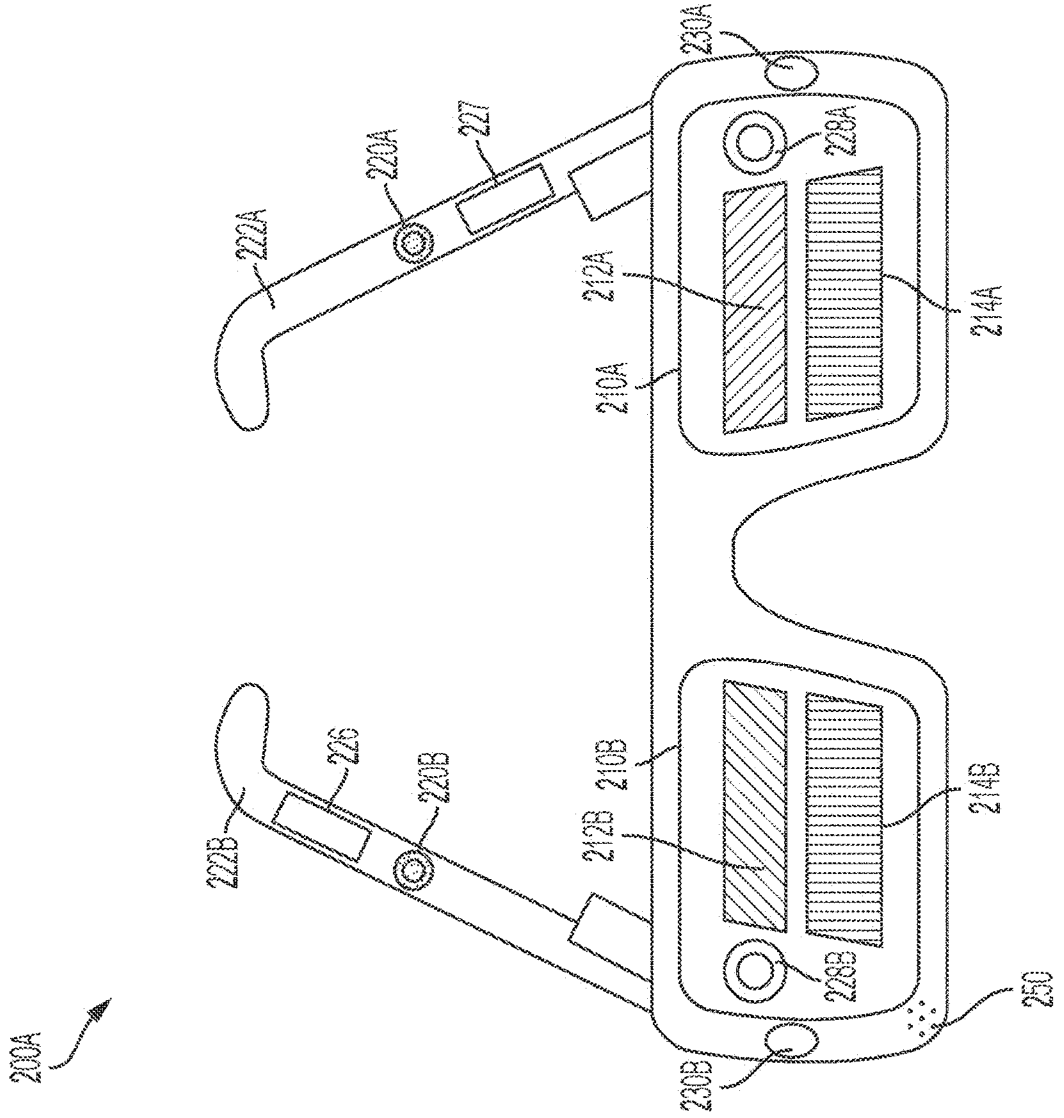
FIGS. 2A-2B illustrate example wearable systems according to some embodiments of the disclosure.

FIG. 2A illustrates an example wearable head device 200A configured to be worn on the head of a user. Wearable head device 200A may be part of a broader wearable system that comprises one or more components, such as a head device (e.g., wearable head device 200A), a handheld controller (e.g., handheld controller 300 described below), and/or an auxiliary unit (e.g., auxiliary unit 400 described below). In some examples, wearable head device 200A can be used for AR, MR, or XR systems or applications. Wearable head device 200A can comprise one or more displays, such as displays 210A and 210B (which may comprise left and right transmissive displays, and associated components for coupling light from the displays to the user's eyes, such as orthogonal pupil expansion (OPE) grating sets 212A/212B and exit pupil expansion (EPE) grating sets 214A/214B); left and right acoustic structures, such as speakers 220A and 220B (which may be mounted on temple arms 222A and 222B, and positioned adjacent to the user's left and right ears, respectively); one or more sensors such as infrared sensors, accelerometers, GPS units, inertial measurement units (IMUs, e.g. IMU 226), acoustic sensors (e.g., microphones 250); orthogonal coil electromagnetic receivers (e.g., receiver 227 shown mounted to the left temple arm 222A); left and right cameras (e.g., depth (time-of-flight) cameras 230A and 230B) oriented away from the user; and left and right eye cameras oriented toward the user (e.g., for detecting the user's eye movements) (e.g., eye cameras 228A and 228B). However, wearable head device 200A can incorporate any suitable display technology, and any suitable number, type, or combination of sensors or other components without departing from the scope of the invention. In some examples, wearable head device 200A may incorporate one or more microphones 250 configured to detect audio signals generated by the user's voice; such microphones may be positioned adjacent to the user's mouth and/or on one or both sides of the user's head. In some examples, wearable head device 200A may incorporate networking features (e.g., Wi-Fi capability) to communicate with other devices and systems, including other wearable systems. Wearable head device 200A may further include components such as a battery, a processor, a memory, a storage unit, or various input devices (e.g., buttons, touchpads); or may be coupled to a handheld controller (e.g., handheld controller 300) or an auxiliary unit (e.g., auxiliary unit 400) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 200A may be coupled to a handheld controller 300, and/or an auxiliary unit 400, as described further below.

Figure 2B:
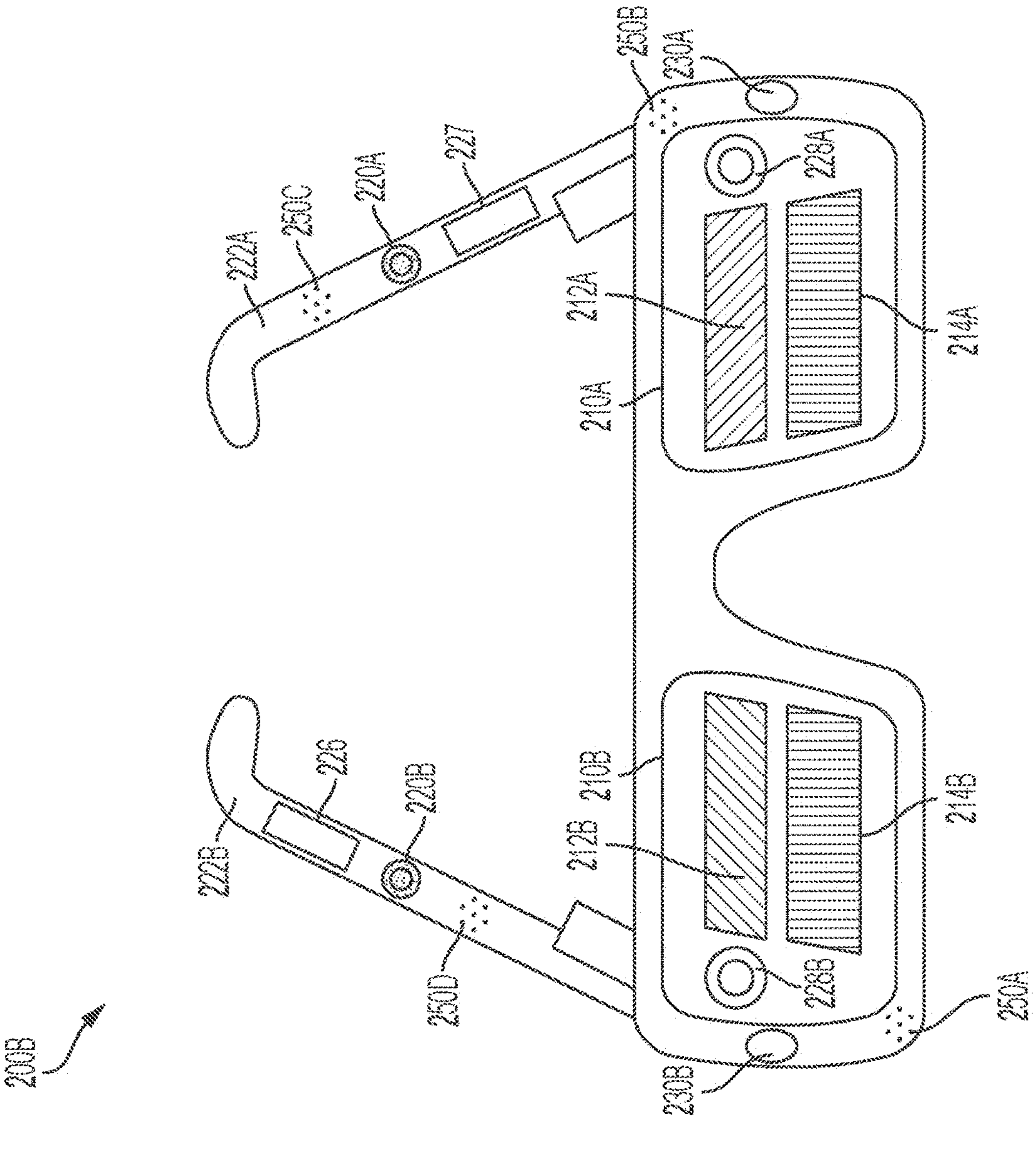

FIG. 2B illustrates an example wearable head device 200B (that can correspond to wearable head device 200A) configured to be worn on the head of a user. In some embodiments, wearable head device 200B can include a multi-microphone configuration, including microphones 250A, 250B, 250C, and 250D. Multi-microphone configurations can provide spatial information about a sound source in addition to audio information. For example, signal processing techniques can be used to determine a relative position of an audio source to wearable head device 200B based on the amplitudes of the signals received at the multi-microphone configuration. If the same audio signal is received with a larger amplitude at microphone 250A than at 250B, it can be determined that the audio source is closer to microphone 250A than to microphone 250B. Asymmetric or symmetric microphone configurations can be used. In some embodiments, it can be advantageous to asymmetrically configure microphones 250A and 250B on a front face of wearable head device 200B. For example, an asymmetric configuration of microphones 250A and 250B can provide spatial information pertaining to height (e.g., a distance from a first microphone to a voice source (e.g., the user's mouth, the user's throat) and a second distance from a second microphone to the voice source are different). This can be used to distinguish a user's speech from other human speech. For example, a ratio of amplitudes received at microphone 250A and at microphone 250B can be expected for a user's mouth to determine that an audio source is from the user. In some embodiments, a symmetrical configuration may be able to distinguish a user's speech from other human speech to the left or right of a user. Although four microphones are shown in FIG. 2B, it is contemplated that any suitable number of microphones can be used, and the microphone(s) can be arranged in any suitable (e.g., symmetrical or asymmetrical) configuration.

Figure 3:
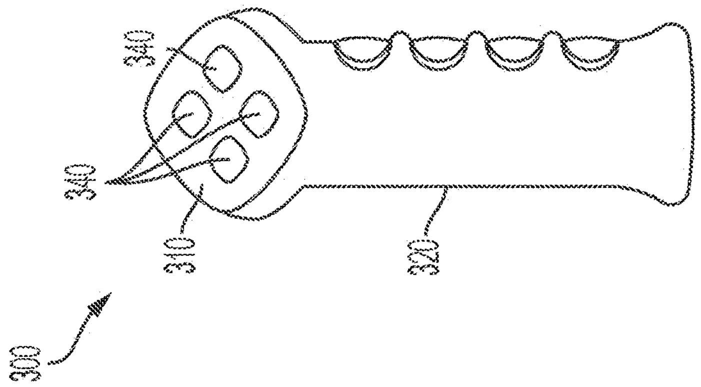
FIG. 3 illustrates an example handheld controller that can be used in conjunction with an example wearable system according to some embodiments of the disclosure.

FIG. 3 illustrates an example mobile handheld controller component 300 of an example wearable system. In some examples, handheld controller 300 may be in wired or wireless communication with wearable head device 200A and/or 200B and/or auxiliary unit 400 described below. In some examples, handheld controller 300 includes a handle portion 320 to be held by a user, and one or more buttons 340 disposed along a top surface 310. In some examples, handheld controller 300 may be configured for use as an optical tracking target; for example, a sensor (e.g., a camera or other optical sensor) of wearable head device 200A and/or 200B can be configured to detect a position and/or orientation of handheld controller 300—which may, by extension, indicate a position and/or orientation of the hand of a user holding handheld controller 300. In some examples, handheld controller 300 may include a processor, a memory, a storage unit, a display, or one or more input devices, such as ones described herein. In some examples, handheld controller 300 includes one or more sensors (e.g., any of the sensors or tracking components described herein with respect to wearable head device 200A and/or 200B). In some examples, sensors can detect a position or orientation of handheld controller 300 relative to wearable head device 200A and/or 200B or to another component of a wearable system. In some examples, sensors may be positioned in handle portion 320 of handheld controller 300, and/or may be mechanically coupled to the handheld controller. Handheld controller 300 can be configured to provide one or more output signals, corresponding, for example, to a pressed state of the buttons 340; or a position, orientation, and/or motion of the handheld controller 300 (e.g., via an IMU). Such output signals may be used as input to a processor of wearable head device 200A and/or 200B, to auxiliary unit 400, or to another component of a wearable system. In some examples, handheld controller 300 can include one or more microphones to detect sounds (e.g., a user's speech, environmental sounds), and in some cases provide a signal corresponding to the detected sound to a processor (e.g., a processor of wearable head device 200A and/or 200B).

Figure 4:
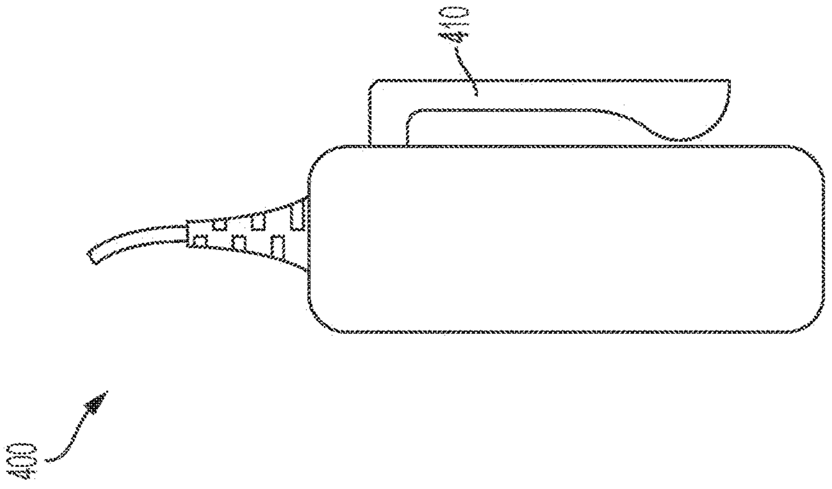
FIG. 4 illustrates an example auxiliary unit that can be used in conjunction with an example wearable system according to some embodiments of the disclosure.

FIG. 4 illustrates an example auxiliary unit 400 of an example wearable system. In some examples, auxiliary unit 400 may be in wired or wireless communication with wearable head device 200A and/or 200B and/or handheld controller 300. The auxiliary unit 400 can include a battery to primarily or supplementally provide energy to operate one or more components of a wearable system, such as wearable head device 200A and/or 200B and/or handheld controller 300 (including displays, sensors, acoustic structures, processors, microphones, and/or other components of wearable head device 200A and/or 200B or handheld controller 300). In some examples, auxiliary unit 400 may include a processor, a memory, a storage unit, a display, one or more input devices, and/or one or more sensors, such as ones described herein. In some examples, auxiliary unit 400 includes a clip 410 for attaching the auxiliary unit to a user (e.g., attaching the auxiliary unit to a belt worn by the user). An advantage of using auxiliary unit 400 to house one or more components of a wearable system is that doing so may allow larger or heavier components to be carried on a user's waist, chest, or back-which are relatively well suited to support larger and heavier objects-rather than mounted to the user's head (e.g., if housed in wearable head device 200A and/or 200B) or carried by the user's hand (e.g., if housed in handheld controller 300). This may be particularly advantageous for relatively heavier or bulkier components, such as batteries.

Figure 5A:
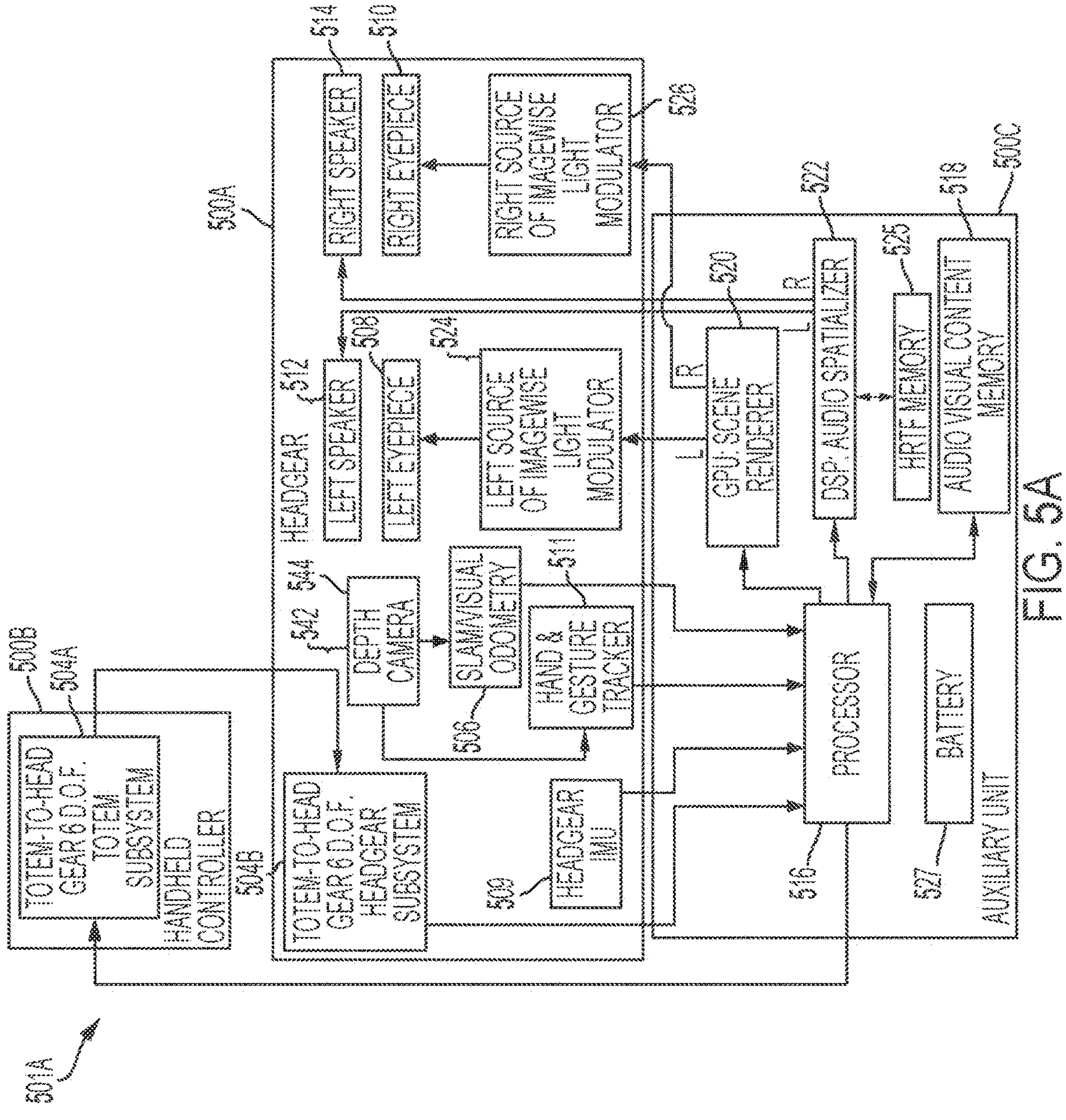
FIGS. 5A-5B illustrate example functional block diagrams for an example wearable system according to some embodiments of the disclosure.

FIG. 5A shows an example functional block diagram that may correspond to an example wearable system 501A; such system may include example wearable head device 200A and/or 200B, handheld controller 300, and auxiliary unit 400 described herein. In some examples, the wearable system 501A could be used for AR, MR, or XR applications. As shown in FIG. 5, wearable system 501A can include example handheld controller 500B, referred to here as a "totem" (and which may correspond to handheld controller 300); the handheld controller 500B can include a totem-to-headgear six degree of freedom (6DOF) totem subsystem 504A. Wearable system 501A can also include example headgear device 500A (which may correspond to wearable head device 200A and/or 200B); the headgear device 500A includes a totem-to-headgear 6DOF headgear subsystem 504B. In the example, the 6DOF totem subsystem 504A and the 6DOF headgear subsystem 504B cooperate to determine six coordinates (e.g., offsets in three translation directions and rotation along three axes) of the handheld controller 500B relative to the headgear device 500A. The six degrees of freedom may be expressed relative to a coordinate system of the headgear device 500A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 544 (and/or one or more non-depth cameras) included in the headgear device 500A; and/or one or more optical targets (e.g., buttons 340 of handheld controller 300 as described, dedicated optical targets included in the handheld controller) can be used for 6DOF tracking. In some examples, the handheld controller 500B can include a camera, as described; and the headgear device 500A can include an optical target for optical tracking in conjunction with the camera. In some examples, the headgear device 500A and the handheld controller 500B each include a set of three orthogonally oriented solenoids which are used to wirelessly send and receive three distinguishable signals. By measuring the relative magnitude of the three distinguishable signals received in each of the coils used for receiving, the 6DOF of the handheld controller 500B relative to the headgear device 500A may be determined. In some examples, 6DOF totem subsystem 504A can include an Inertial Measurement Unit (IMU) that is useful to provide improved accuracy and/or more timely information on rapid movements of the handheld controller 500B.

Figure 5B:
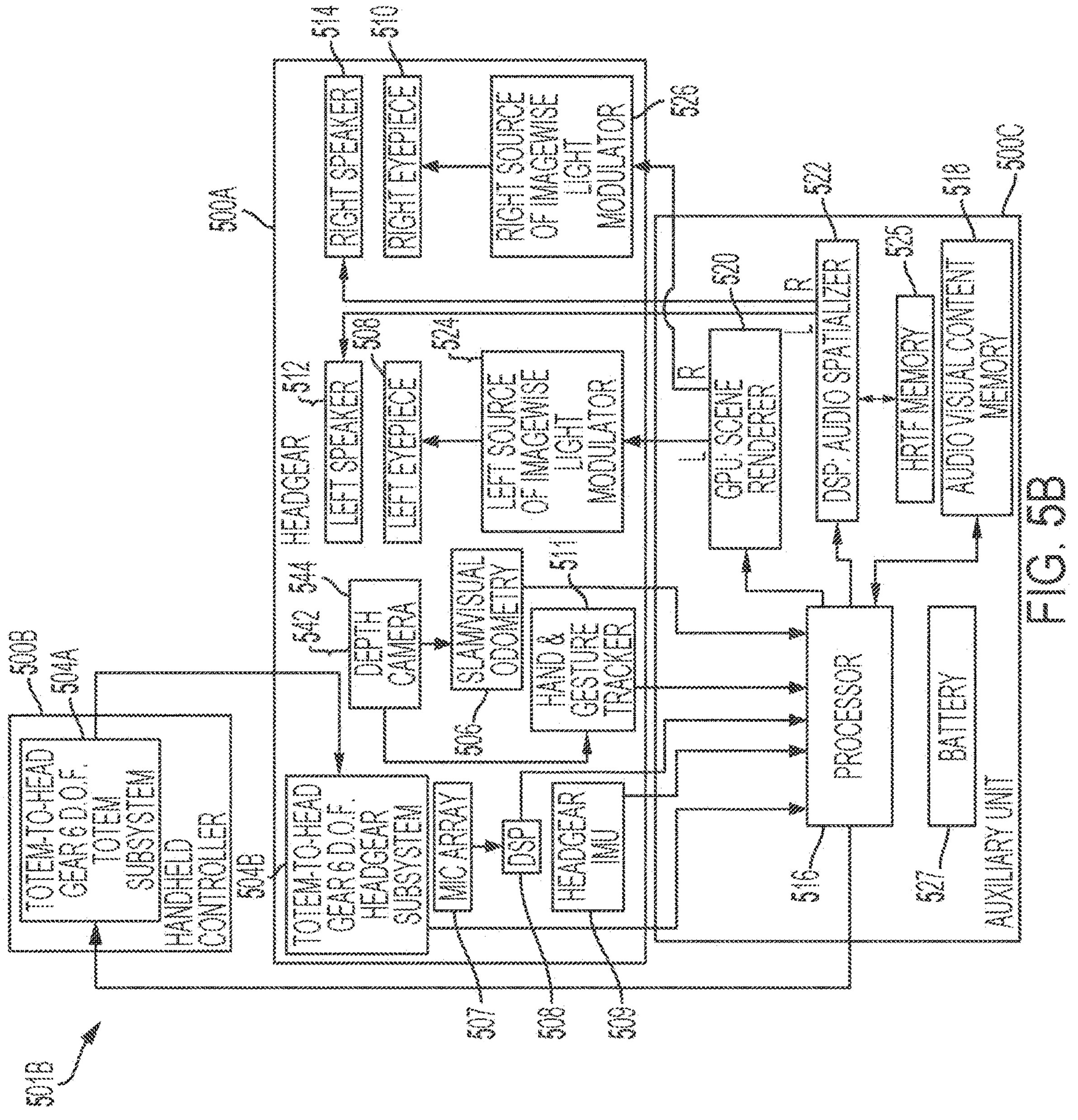

FIG. 5B shows an example functional block diagram that may correspond to an example wearable system 501B (which can correspond to example wearable system 501A). In some embodiments, wearable system 501B can include microphone array 507, which can include one or more microphones arranged on headgear device 500A. In some embodiments, microphone array 507 can include four microphones. Two microphones can be placed on a front face of headgear 500A, and two microphones can be placed at a rear of head headgear 500A (e.g., one at a back-left and one at a back-right), such as the configuration described with respect to FIG. 2B. The microphone array 507 can include any suitable number of microphones, and can include a single microphone. In some embodiments, signals received by microphone array 507 can be transmitted to DSP 508. DSP 508 can be configured to perform signal processing on the signals received from microphone array 507. For example, DSP 508 can be configured to perform noise reduction, acoustic echo cancellation, and/or beamforming on signals received from microphone array 507. DSP 508 can be configured to transmit signals to processor 516. In some embodiments, the system 501B can include multiple signal processing stages that may each be associated with one or more microphones. In some embodiments, the multiple signal processing stages are each associated with a microphone of a combination of two or more microphones used for beamforming. In some embodiments, the multiple signal processing stages are each associated with noise reduction or echo-cancellation algorithms used to pre-process a signal used for either voice onset detection, key phrase detection, or endpoint detection.

In some examples involving augmented reality or mixed reality applications, it may be desirable to transform coordinates from a local coordinate space (e.g., a coordinate space fixed relative to headgear device 500A) to an inertial coordinate space, or to an environmental coordinate space. For instance, such transformations may be necessary for a display of headgear device 500A to present a virtual object at an expected position and orientation relative to the real environment (e.g., a virtual person sitting in a real chair, facing forward, regardless of the position and orientation of headgear device 500A), rather than at a fixed position and orientation on the display (e.g., at the same position in the display of headgear device 500A). This can maintain an illusion that the virtual object exists in the real environment (and does not, for example, appear positioned unnaturally in the real environment as the headgear device 500A shifts and rotates). In some examples, a compensatory transformation between coordinate spaces can be determined by processing imagery from the depth cameras 544 (e.g., using a Simultaneous Localization and Mapping (SLAM) and/or visual odometry procedure) in order to determine the transformation of the headgear device 500A relative to an inertial or environmental coordinate system. In the example shown in FIG. 5, the depth cameras 544 can be coupled to a SLAM/visual odometry block 506 and can provide imagery to block 506. The SLAM/visual odometry block 506 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 509 of headgear device 500A. Information from the IMU 509 can be integrated with information from the SLAM/visual odometry block 506 to provide improved accuracy and/or more timely information on rapid adjustments of the user's head pose and position.

In some examples, the depth cameras 544 can supply 3D imagery to a hand gesture tracker 511, which may be implemented in a processor of headgear device 500A. The hand gesture tracker 511 can identify a user's hand gestures, for example by matching 3D imagery received from the depth cameras 544 to stored patterns representing hand gestures. Other suitable techniques of identifying a user's hand gestures will be apparent.

In some examples, one or more processors 516 may be configured to receive data from headgear subsystem 504B, the IMU 509, the SLAM/visual odometry block 506, depth cameras 544, microphones 550; and/or the hand gesture tracker 511. The processor 516 can also send and receive control signals from the 6DOF totem system 504A. The processor 516 may be coupled to the 6DOF totem system 504A wirelessly, such as in examples where the handheld controller 500B is untethered. Processor 516 may further communicate with additional components, such as an audio-visual content memory 518, a Graphical Processing Unit (GPU) 520, and/or a Digital Signal Processor (DSP) audio spatializer 522. The DSP audio spatializer 522 may be coupled to a Head Related Transfer Function (HRTF) memory 525. The GPU 520 can include a left channel output coupled to the left source of imagewise modulated light 524 and a right channel output coupled to the right source of imagewise modulated light 526. GPU 520 can output stereoscopic image data to the sources of imagewise modulated light 524, 526. The DSP audio spatializer 522 can output audio to a left speaker 512 and/or a right speaker 514. The DSP audio spatializer 522 can receive input from processor 519 indicating a direction vector from a user to a virtual sound source (which may be moved by the user, e.g., via the handheld controller 500B). Based on the direction vector, the DSP audio spatializer 522 can determine a corresponding HRTF (e.g., by accessing a HRTF, or by interpolating multiple HRTFs). The DSP audio spatializer 522 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 5, one or more of processor 516, GPU 520, DSP audio spatializer 522, HRTF memory 525, and audio/visual content memory 518 may be included in an auxiliary unit 500C (which may correspond to auxiliary unit 400). The auxiliary unit 500C may include a battery 527 to power its components and/or to supply power to headgear device 500A and/or handheld controller 500B. Including such components in an auxiliary unit, which can be mounted to a user's waist, can limit or reduce the size and weight of headgear device 500A, which can in turn reduce fatigue of a user's head and neck. In some embodiments, the auxiliary unit is a cell phone, tablet, or a second computing device.

While FIGS. 5A and 5B present elements corresponding to various components of an example wearable systems 501A and 501B, various other suitable arrangements of these components will become apparent to those skilled in the art. For example, the headgear device 500A illustrated in FIG. 5A or FIG. 5B may include a processor and/or a battery (not shown). The included processor and/or battery may operate together with or operate in place of the processor and/or battery of the auxiliary unit 500C. Generally, as another example, elements presented or functionalities described with respect to FIG. 5 as being associated with auxiliary unit 500C could instead be associated with headgear device 500A or handheld controller 500B. Furthermore, some wearable systems may forgo entirely a handheld controller 500B or auxiliary unit 500C. Such changes and modifications are to be understood as being included within the scope of the disclosed examples.

Figure 6:
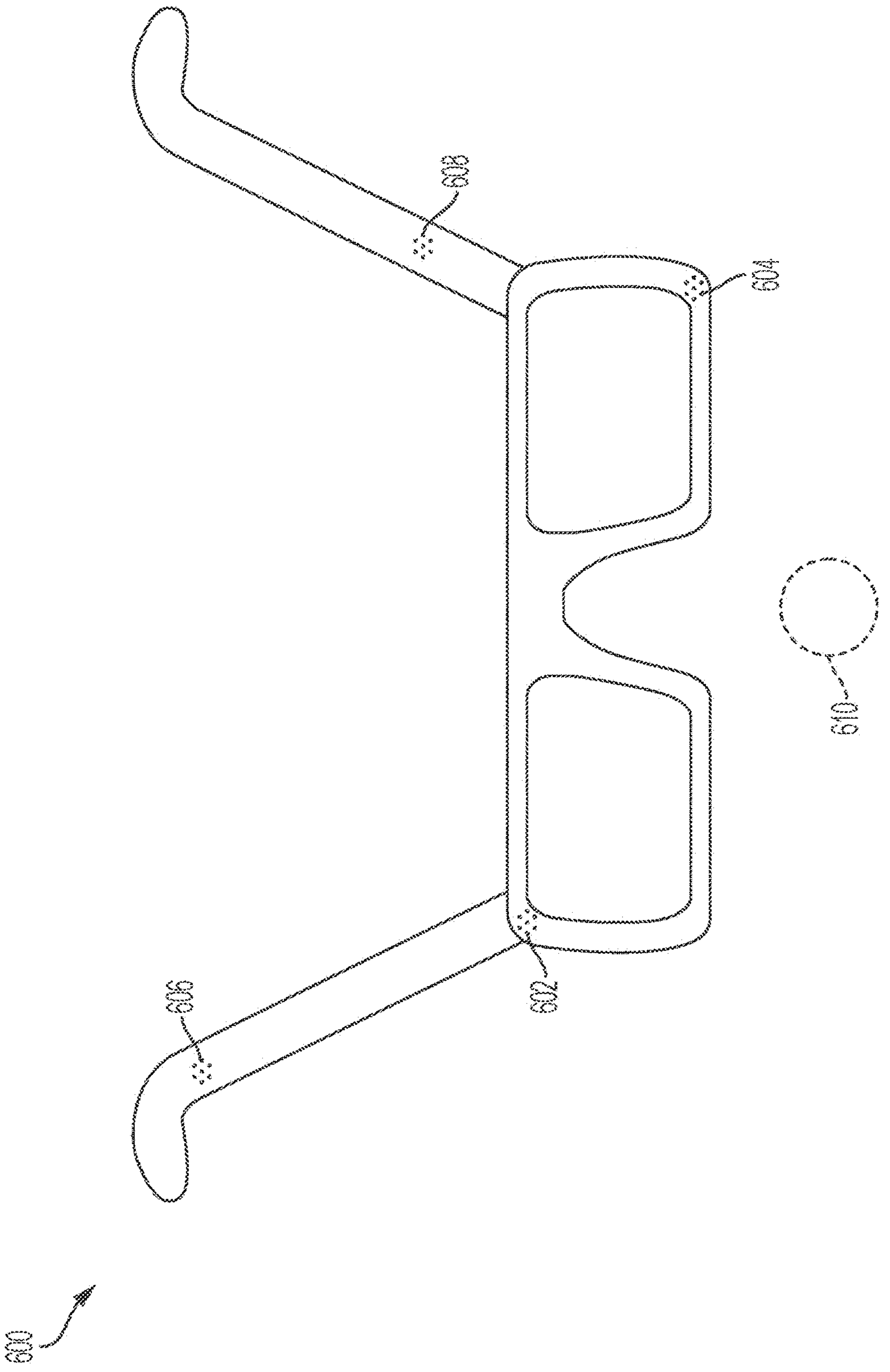
FIG. 6 illustrates an example mixed reality system according to some embodiments of the disclosure.

FIG. 6 illustrates an example MR system 600 system according to some embodiments of the disclosure. In some embodiments, the wearable head device 600 comprises microphones 602, 604, 606, and 608. In some embodiments, wearable head device 600 corresponds to MR system 112, wearable head device 200, or wearable head device 500. For example, microphone 602 corresponds to microphone 250A or a first mic of mic array 507, microphone 604 corresponds to microphone 250B or a second mic of mic array 507, microphone 606 corresponds to microphone 250D or a third mic of mic array 507, and microphone 608 corresponds to microphone 250C or a fourth mic of mic array 507.

In some embodiments, the microphones 602 and 604 are offset about a Z-axis (e.g., z-axis 114Z). For example, the microphone 602 is at a first Z value, and the microphone 604 is at a second Z value. In some embodiments, the microphones 606 and 608 are offset about an X-axis (e.g., x-axis 114X). For example, the microphone 606 is at a first X value, and the microphone 608 is at a second X value. In some embodiments, the microphones 606 and 608 are proximal to the user's ears (e.g., 3-6 cm from the user's ears). By locating the microphones 606 and 608 proximal to the user's ears, ambient noise around the user's ears may be more accurately captured, and a speaker output signal (e.g., configured for acoustic cancellation) may more accurately cancel the ambient noise.

It is understood that the illustrated microphone locations in FIG. 6 are not meant to be limiting. A pair of microphones may be offset along any axis of an environment (e.g., an axis along a direction of a basis vector of the environment) of the MR system 600. A pair of microphones may also be offset differently than illustrated. For example, in some embodiments, the microphone 604 is located higher along the Z-axis than the location of the microphone 602. More generally, to achieve the disclosed features and benefits, the disclosed MR systems may include four microphones; three of the four microphones are coplanar, and the fourth microphone is not part of a plane formed by the other three microphones.

The microphone configuration of MR system 600 advantageously allows sound information to be captured along an axis of asymmetry (e.g., an axis of offset between a pair of microphones, Z-axis, X-axis) (e.g., by taking advantage of amplitude and phase differences captured by the different microphones, as a consequence of the asymmetrical configuration), without adding microphones that would result in increased weight and power consumption. That is, the microphone configuration introduces geometrical diversity (e.g., offset along a Z-axis, offset along an X-axis) along three dimensions (e.g., x-axis 114X, y-axis 114Y, z-axis 114Z) to enable discrimination of audio objects (e.g., audio objects (e.g., non-user voice, noise) in a user's vicinity) along the three dimensions. For example, the microphones capture a sound. A first microphone (e.g., a microphone of a plurality of co-planar microphones) generates a first microphone signal based on the captured sound, and the second microphone (e.g., a non-co-planar microphone) generates a second microphone signal based on the captured sound. Based on the amplitude and/or phase difference between the two microphone signals, a non-co-planar component may be derived by the wearable head device.

The microphone configuration of MR system 600 additionally allow the weight and power consumption of the system to be minimized, which may be desirable for a battery-powered device worn by a user, such as a wearable head device.

Because this configuration allows the system to capture sound information along an axis of asymmetry user voice isolation, acoustic cancellation, audio scene analysis, fixed-orientation environment capture, and lobe steering are facilitated because sound information along information along all axis of an environment (e.g., an augmented reality (AR), MR, or extended reality (XR) environment) may be obtained, without suffering from the cost of additional microphones.

In some embodiments, asymmetrical microphone configurations may be used because an asymmetrical configuration may be better suited at distinguishing a user's voice from other audio signals. The MR system 600 (which may correspond to MR system 112, wearable head device 200, or system 501) can be configured to receive voice input from a user. In some embodiments, a first microphone may be placed at location 610, and a second microphone may be placed at location 604. In some embodiments, MR system 600 can include a wearable head device, and a user's mouth may be positioned at location 610. Sound originating from the user's mouth at location 610 may take longer to reach microphone location 602 than microphone location 604 because of the larger travel distance between location 610 and location 602 than between location 610 and location 604.

In some embodiments, an asymmetrical microphone configuration (e.g., the microphone configuration shown in FIG. 2B or FIG. 6) may allow a MR system to more accurately distinguish a user's voice from other audio signals. For example, a person standing directly in front of a user may not be distinguishable from the user with a symmetrical microphone configuration (e.g., the microphones are co-planar) on a wearable head device. A symmetrical microphone configuration may result in both microphones receiving speech signals at the same time, regardless of whether the user was speaking or if the person directly in front of the user is speaking. This may allow the person directly in front of the user to "hijack" a MR system by issuing voice commands that the MR system may not be able to determine as originating from someone other than the user. In some embodiments, an asymmetrical microphone configuration may more accurately distinguish a user's voice from other audio signals. For example, microphones placed at locations 602 and 604 may receive audio signals from the user's mouth at different times, and the difference may be determined by the spacing between locations 602/604 and location 610. However, microphones at locations 602 and 604 may receive audio signals from a person speaking directly in front of a user at the same time. The user's speech may therefore be distinguishable from other sound sources (e.g., another person) because the user's mouth may be at a lower height than microphone locations 602 and 604, which can be determined from a sound delay at position 602 as compared to position 604.

Although asymmetrical microphone configurations may provide additional information about a sound source (e.g., an approximate height of the sound source), a sound delay may complicate subsequent calculations. In some embodiments, adding and/or subtracting audio signals that are offset (e.g., in time) from each other may decrease a signal-to-noise ratio ("SNR"), rather than increasing the SNR (which may happen when the audio signals are not offset from each other). It can therefore be desirable to process audio signals (e.g., using a disclosed microphone signal preconditioning block) received from an asymmetrical microphone configuration such that a beamforming analysis (e.g., noise cancellation, 4-channel beamforming (as disclosed herein)) may still be performed to determine voice activity. In some embodiments, a voice onset event can be determined based on a beamforming analysis and/or single channel analysis. A notification may be transmitted to a processor (e.g., a DSP or x86 processor) in response to determining that a voice onset event has occurred. The notification may include information such as a timestamp of the voice onset event and/or a request that the processor begin speech recognition.

In some embodiments, because the microphone arrangement of MR system 600 provides more information along all axes of the environment (e.g., improved Z-axis captured without additional microphones), the disclose microphone arrangements also advantageously allow improved user voice isolation, acoustic cancellation, audio scene analysis, fixed-orientation environment capture and lobe steering, compared to a symmetric microphone arrangement. For example, voices (e.g., a non-user voice) and noises around the user (e.g., left, right, front, back, or above the user) may be more accurately rejected. As another example, the disclosed microphone arrangements allow a sound field (e.g., a sound field at a user's ear) to be better controlled, acoustic cancellation (e.g., acoustic echo cancellation using a disclosed acoustic echo cancellation block) may be improved for ambient noise suppression and audio object occlusion.

As yet another example, the disclosed microphone arrangements may improve an audio scene analysis by allowing real-time, low-latency detection (e.g., acoustic detection) of scene elements that may not be detectable (e.g., visible) by cameras. The disclosed microphone arrangements may be used for acoustic detection in conjunction with or in lieu of other scene detection methods (e.g., simultaneous localization and mapping, visual inertial odometry) and/or other scene detection sensors (e.g., camera, gyroscope, inertial measurement unit, LiDAR sensor, or other suitable sensor). As yet another example, the disclosed microphone arrangements allow the system to record a sound field more independently from a user's movements (e.g., head rotation) (e.g., by allowing head movement along all axes of the environment to be detected acoustically, by allowing a sound field that may be more easily adjusted (e.g., the sound field has more information along different axes of the environment) to compensate these movements). More examples of these features and advantages are described herein.

As yet another example, the disclosed microphone arrangements allow beamformer lobe to be resolved along an angle (e.g., an angle about a Z-axis, steerable beamforming along angles in ISO-80000-2:2019 spherical coordinates) with less required microphones. For example, the disclosed four microphone arrangements advantageously allow beamformer lobe to be steered along three axis and/or polar coordinates of an environment, compared to six microphones (two per axis). As examples, the beamformed patterns include at least one of cardioid, hypercardioid, supercardioid, dipole, bipolar, and shotgun shapes. The disclosed microphone arrangements also allow a sound field (e.g., Ambisonics) to form along the axes of an environment with less required microphones.

Figure 7:
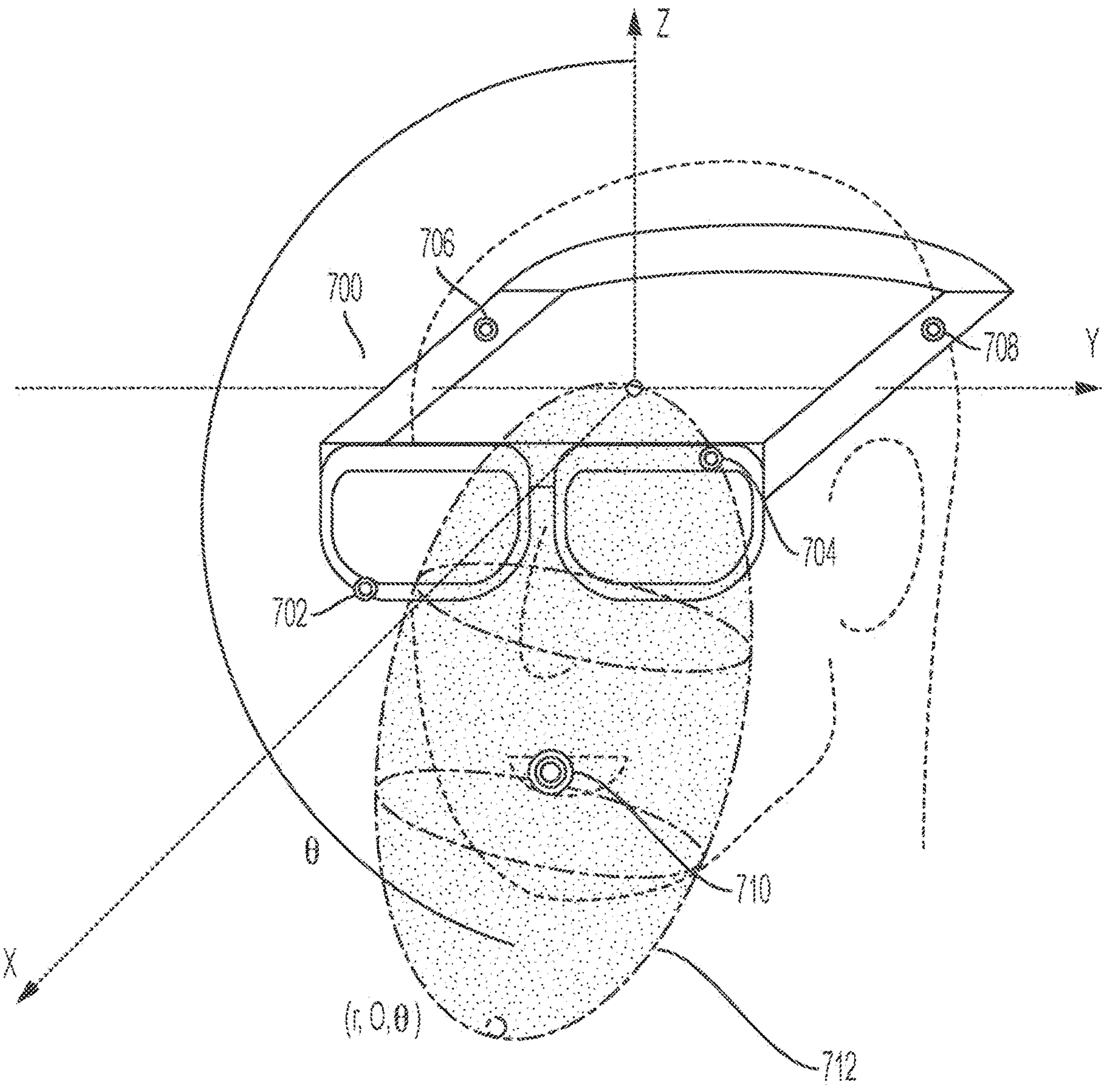
FIG. 7 illustrates an example mixed reality system according to some embodiments of the disclosure.

FIG. 7 illustrates an example MR system 700 according to some embodiments of the disclosure. In some embodiments, the MR system 700 comprises microphones 702, 704, 706, and 708. In some embodiments, MR system 700 corresponds to MR system 112, wearable head device 200, MR system 501, or MR system 600. For example, microphone 702 corresponds to microphone 250A or 602, microphone 704 corresponds to microphone 250B or 604, microphone 706 corresponds to microphone 250D or 606, and microphone 708 corresponds to microphone 250C or 608. For the sake of brevity, some examples and advantages of the MR system are not described here.

In some embodiments, FIG. 7 shows a user's voice originating at location 710 (e.g., corresponding to location 610, the user's mouth). The positions of the user and the MR system 700 are represented by the illustrated coordinate system. The coordinate system may include X (e.g., corresponding to x-axis 114X), Y (e.g., corresponding to y-axis 114Y), and Z (e.g., corresponding to z-axis 114Z) axes. In some embodiments, the coordinate system represents ISO-80000-2:2019 spherical coordinates.

As illustrated, the sound from the user at location 710 is at an angle θ (e.g., a polar angle) relative to the positive Z-axis. The microphone arrangement of MR system 700 advantageously allow a beamforming pattern to more accurately capture the sound from the user. For example, the beamforming patterns generated from the microphone arrangement may more accurately reject non-user sounds or noises in front of the user (e.g., from a non-user sound or noise source on the X-Y plane). For example, a beamforming pattern comprising a main directional lobe 712 (for clarity, side and rear lobes are not shown) may be formed to more accurately capture the sound from the user. In some embodiments, the main directional lob 712 is configured to include the location 710 (e.g., to capture the intended sound source). For example, the pattern is formed such that a focus of the main directional lobe 712 is located at location 710. The main directional lobe 712 may have a length of r (e.g., a radial component).

As illustrated by this example, the microphone arrangement advantageously allows polar angle steering (e.g., rotating by an angle θ and lengthening by r) with a minimum number of microphones. Polar angle steering may not be possible (e.g., the beamforming patterns are fixed at θ=90 degrees) using a four-microphone symmetrical configuration (e.g., the four-microphones are co-planar).

Figure 8:
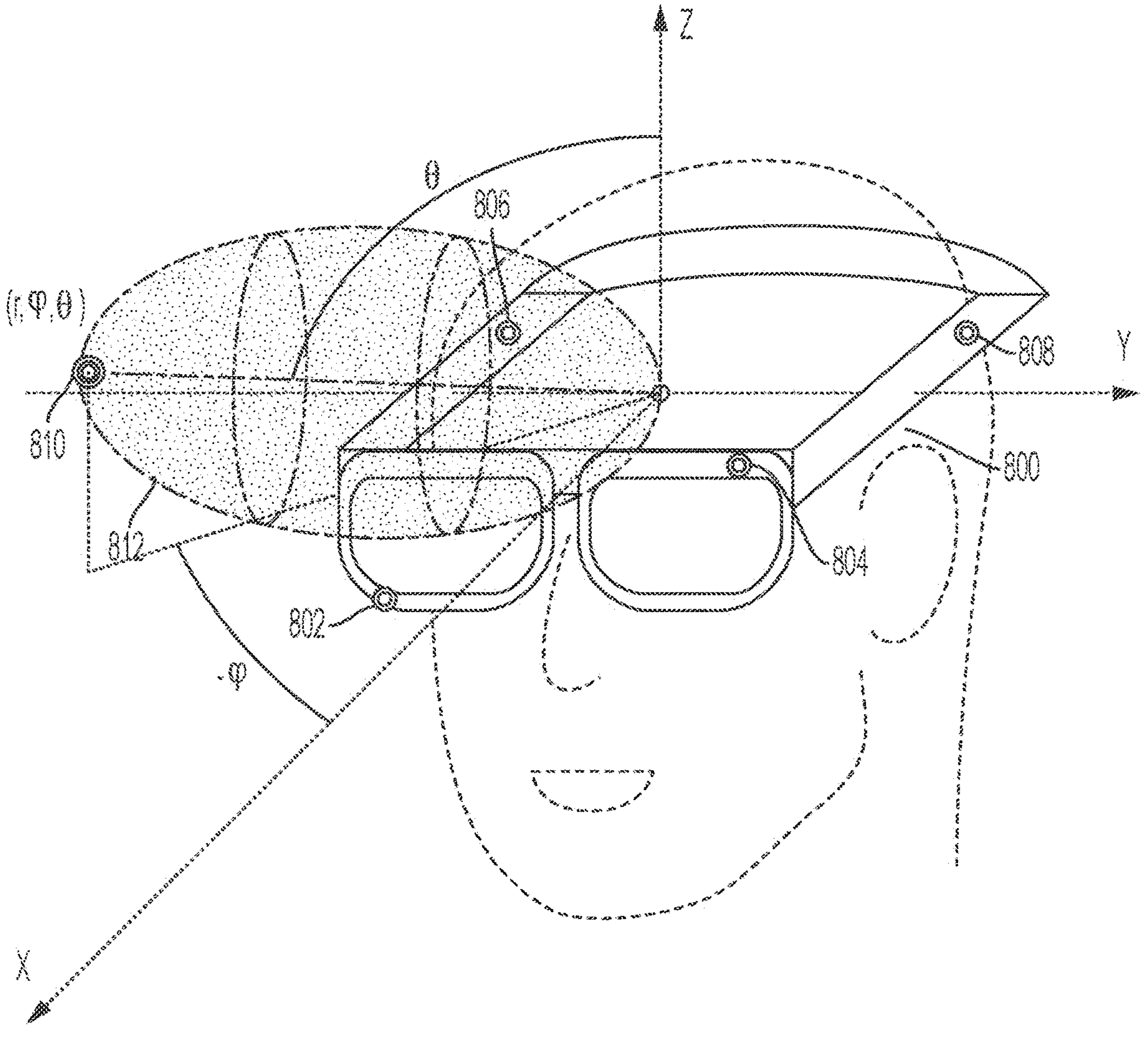
FIG. 8 illustrates an example mixed reality system according to some embodiments of the disclosure.

FIG. 8 illustrates an example MR system 800 according to some embodiments of the disclosure. In some embodiments, the MR system 800 comprises microphones 802, 804, 806, and 808. In some embodiments, MR system 800 corresponds to MR system 112, wearable head device 200, MR system 501, or MR system 600. For example, microphone 802 corresponds to microphone 250A or 602, microphone 804 corresponds to microphone 250B or 604, microphone 806 corresponds to microphone 250D or 606, and microphone 808 corresponds to microphone 250C or 608. For the sake of brevity, some examples and advantages of the MR system are not described here.

In some embodiments, FIG. 8 shows a sound originating at location 810 (e.g., a sound being captured, a sound being recorded). The positions of the user and the MR system 800 are represented by the illustrated coordinate system. The coordinate system may include X (e.g., corresponding to x-axis 114X), Y (e.g., corresponding to y-axis 114Y), and Z (e.g., corresponding to z-axis 114Z) axes. In some embodiments, the coordinate system represents ISO-80000-2:2019 spherical coordinates.

As illustrated, the sound at location 810 is at an angle θ (e.g., a polar angle) relative to the positive Z-axis and at an angle-q (e.g., an azimuthal angle) relative to the positive X-axis. The microphone arrangement of MR system 800 advantageously allow a beamforming pattern to more accurately capture the sound. For example, the beamforming patterns generated from the microphone arrangement may more accurately reject unintended captures (e.g., from a non-user sound or noise source around the location 810). For example, a beamforming pattern comprising a main directional lobe 812 (for clarity, side and rear lobes are not shown) may be formed to more accurately capture the sound at location 810. In some embodiments, the main directional lob 812 is configured to include the location 810 (e.g., to capture the intended sound source). For example, the location 810 is located at an edge of the main directional lobe 812. The main directional lobe 812 may have a length of r.

As illustrated by this example, the microphone arrangement advantageously allows polar angle steering (e.g., rotating by an angles θ and φ and lengthening by r) with a minimum number of microphones. Polar angle steering may not be possible (e.g., the beamforming patterns are fixed at θ=90 degrees, and may not reach the location 810 at (r, φ, θ)) using a four-microphone symmetrical configuration (e.g., the four-microphones are co-planar).

Figure 9:
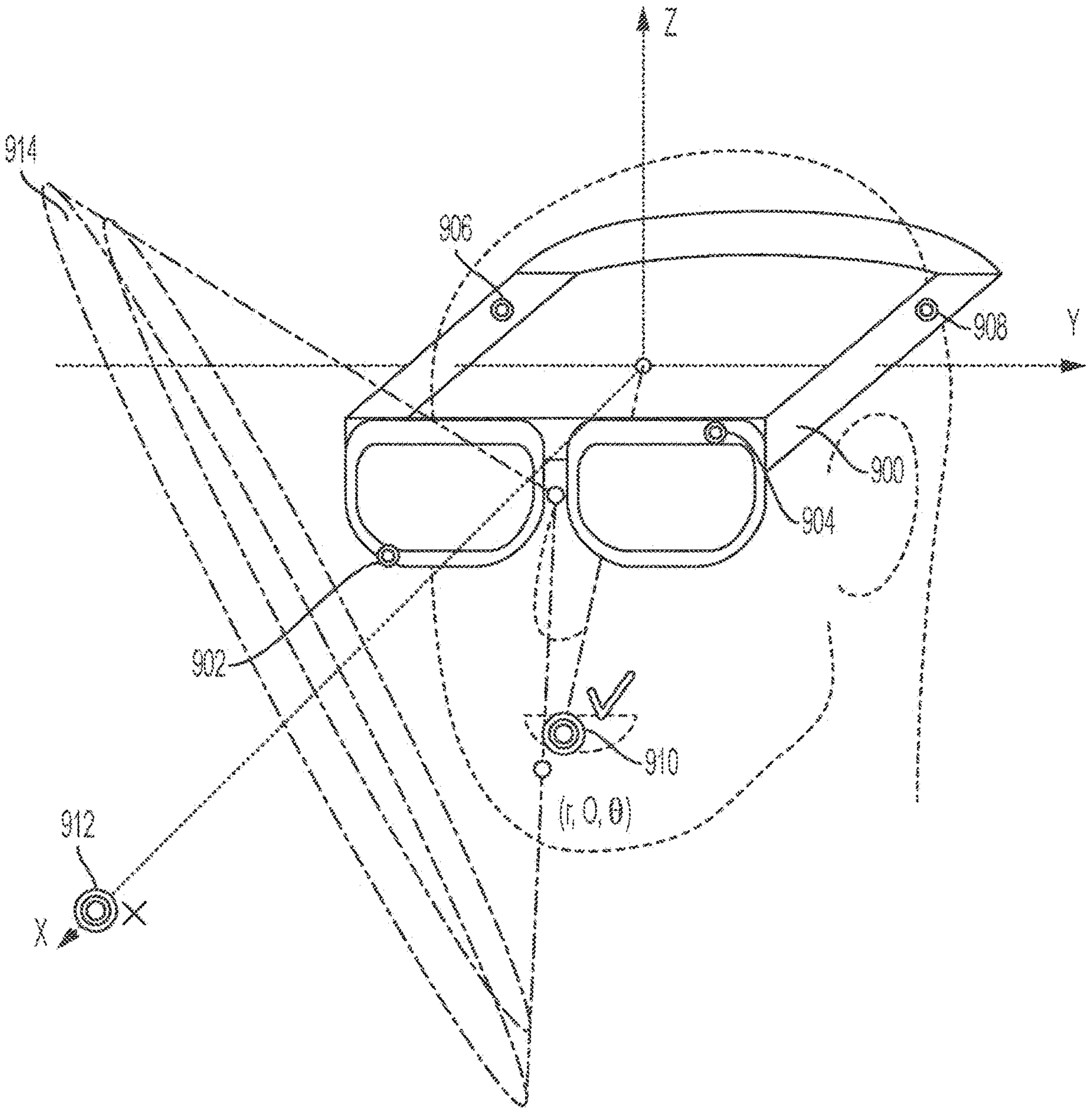
FIG. 9 illustrates an example mixed reality system according to some embodiments of the disclosure.

FIG. 9 illustrates an example MR system 900 according to some embodiments of the disclosure. In some embodiments, the MR system 900 comprises microphones 902, 904, 906, and 908. In some embodiments, MR system 900 corresponds to MR system 112, wearable head device 200, MR system 501, or MR system 600. For example, microphone 902 corresponds to microphone 250A or 602, microphone 904 corresponds to microphone 250B or 604, microphone 906 corresponds to microphone 250D or 606, and microphone 908 corresponds to microphone 250C or 608. For the sake of brevity, some examples and advantages of the MR system are not described here.

In some embodiments, FIG. 9 shows a user's voice originating at location 910 (e.g., corresponding to location 610, the user's mouth). The positions of the user and the MR system 900 are represented by the illustrated coordinate system. The coordinate system may include X (e.g., corresponding to x-axis 114X), Y (e.g., corresponding to y-axis 114Y), and Z (e.g., corresponding to z-axis 114Z) axes. In some embodiments, the coordinate system represents ISO-80000-2:2019 spherical coordinates.

As illustrated, the sound from the user at location 910 is at an angle θ relative to the positive Z-axis. The microphone arrangement of MR system 900 advantageously allow a beamforming pattern to more accurately capture the sound from the user. For example, the beamforming patterns generated from the microphone arrangement may more accurately reject non-user sounds or noises in front of the user (e.g., from a non-user sound or noise source on the X-Y plane). As described with respect to FIG. 7, the MR system allows beamforming patterns to be steered along polar coordinates (e.g., the angle θ), allowing the voice at location 910 to be more accurately picked up. As illustrated in FIG. 9, a non-user sound or noise source on the X-Y plane (e.g., located at location 912) would be rejected and not be picked up by the beamforming pattern formed by the microphone configuration.

In some embodiments, the cone 914 represent a pickup cone that has a focus along the edges of the cone, but a null centered on the x-axis. Thus, as illustrated, the cone 914 rejects the distractor voice pickup (e.g., located at location 912).

Figure 10:
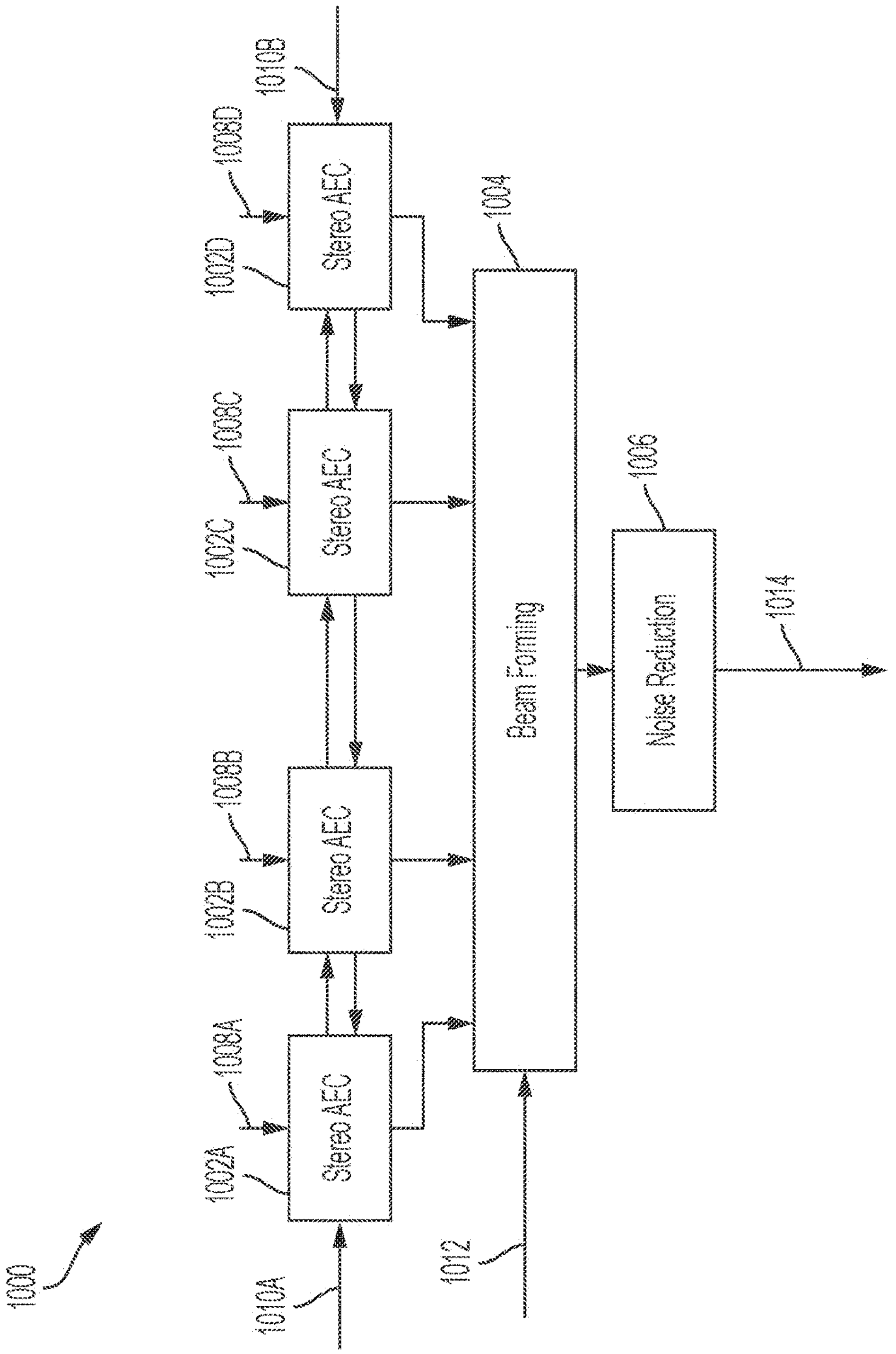
FIG. 10 illustrates an example diagram of a mixed reality system according to some embodiments of the disclosure.

FIG. 10 illustrates an example diagram 1000 of a MR system according to some embodiments of the disclosure. Although the diagram 1000 is illustrated as including the described components, it is understood that a different order of components, additional components, or fewer components may be included without departing from the scope of the disclosure. For example, components of diagram 1000 may be combined with components of other disclosed diagrams (e.g., diagram 1100, diagram 1200).

In some embodiments, some processes described with respect to diagram 1000 are performed with a first processor (e.g., a processor that consumes less power than the second processor, a first processor of a disclosed MR system), and some processes described with respect to diagram 1000 are performed with a second processor (e.g., a processor that has more processing power than the first processor, a second processor of a disclosed MR system). For example, processes performed with respect to the acoustic echo cancellation (AEC) blocks may be performed with the first processor, and the remaining processes may be performed with the second processor. As another example, processes performed with respect to the acoustic echo cancellation (AEC) blocks and beamforming block may be performed with the first processor, and the remaining processes may be performed with the second processor.

In some embodiments, the MR system includes AEC blocks 1002A-1002D. In some embodiments, as illustrated, the AEC blocks 1002A-1002D are stereo AEC blocks. In some embodiments, the AEC blocks are configured to receive microphone signals. For example, each of AEC blocks 1002A-1002D is configured to receive a microphone signal (e.g., microphone signal 1008A-1008D) of the MR system. Ambient noise around the user's ears may be captured (e.g., corresponding to the microphone signals 1008A-1008D), and the AEC blocks 1002A-1002D may generate a signal for a speaker to output an acoustic cancellation signal for acoustic cancellation (e.g., an audio signal that destructively interferes or cancels a level of ambient noise at the user's ears).

Each microphone signal may correspond to a microphone of the MR system. For example, microphone signal 1008A may correspond to microphone 608, microphone signal 1008B may correspond to microphone 604, microphone signal 1008C may correspond to microphone 602, and microphone signal 1008D may correspond to microphone 606.

In some embodiments, the AEC blocks are also configured to receive speaker reference signals. For example, the AEC blocks 1002A-1002D are configured to receive speaker reference signals 1010A and 1010B. The speaker reference signals may represent a magnitude and/or frequency response of a speaker of the MR system, and the speaker reference signals may be used for acoustic echo cancellation. Each of the speaker reference signals may correspond to a speaker of the MR system. For example, speaker reference signal 1010A may correspond to speaker 220A, and speaker reference signal 1010B may correspond to speaker 220B. As discussed earlier, the microphone arrangement of the MR system advantageously allow more acoustic echo cancellation without adding additional microphones.

In some embodiments, outputs of the AEC blocks 1002A-1002D are transmitted to a beamforming block 1004. In some embodiments, the beamforming block 1004 is configured to receive the processed microphone signals (e.g., microphone signals after acoustic echo cancellation) for beamforming. For example, as illustrated, the beamforming block 1004 receives steering parameters 1012. The steering parameters may include angle φ and angle θ. The angle φ and angle θ may correspond to the angle φ and angle θ described with respect to FIGS. 7-9. As discussed earlier, the microphone arrangement of the MR system advantageously allow more robust beamforming without adding additional microphones.

In some embodiments, the beamformed mic signal from the beamforming block 1004 is transmitted to a noise reduction block 1006. The noise reduction block 1006 may reduce any other noises that were not reduced or eliminated during the acoustic echo cancellation (e.g., by AEC blocks 1002A-1002D) or beamforming (e.g., by beamforming block 1004). In some embodiments, the noise reduction block 1006 is configured to output a signal for outputting an acoustic cancellation signal at a speaker. In some embodiments, the noise reduction block 1006 is configured to output a mono mic signal 1014 for further processing (e.g., stored, translated into a system command, processed to become an AR, MR, or XR environment recording). In some embodiments, the noise reduction block 1006 is configured to reject steady state noise such as fans, machines, or electronic self-noise (e.g., MEMS microphones). In some embodiments, the noise reduction block 1006 is configured to adaptively reject a part of a signal determined to not be human speech.

Figure 11:
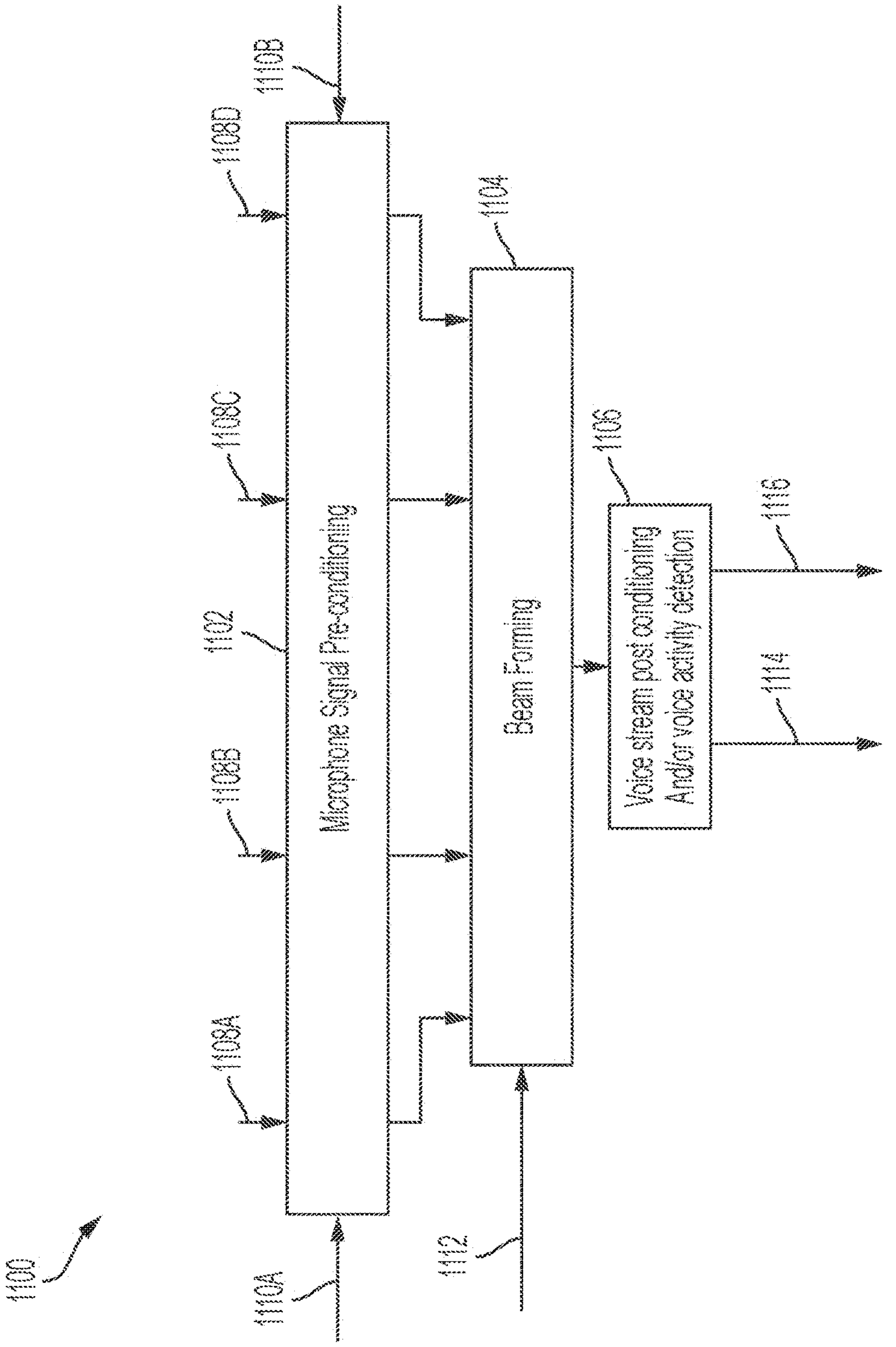
FIG. 11 illustrates an example diagram of a mixed reality system according to some embodiments of the disclosure.

FIG. 11 illustrates an example diagram 1100 of a MR system according to some embodiments of the disclosure. Although the diagram 1100 is illustrated as including the described components, it is understood that a different order of components, additional components, or fewer components may be included without departing from the scope of the disclosure. For example, components of diagram 1000 may be combined with components of other disclosed diagrams (e.g., diagram 1000, diagram 1200).

In some embodiments, some processes described with respect to diagram 1100 are performed with a first processor (e.g., a processor that consumes less power than the second processor, a first processor of a disclosed MR system), and some processes described with respect to diagram 1100 are performed with a second processor (e.g., a processor that has more processing power than the first processor, a second processor of a disclosed MR system). For example, processes performed with respect to the microphone signal preconditioning block may be performed with the first processor, and the remaining processes may be performed with the second processor. As another example, processes performed with respect to the microphone signal preconditioning block and beamforming block may be performed with the first processor, and the remaining processes may be performed with the second processor.

In some embodiments, the MR system includes microphone signal preconditioning block 1102. In some embodiments, the microphone signal preconditioning block 1102 comprises more than one block (e.g., one block per microphone signal). In some embodiments, the microphone signal preconditioning block 1102 is configured to process a microphone signal, adjust for a delay caused by the asymmetric microphone configuration, determine input power, smooth the microphone signal, calculate SNR, determine/remove speaker contribution to a captured sound field, and/or determine sounds of interest from the microphone signals. In some embodiments, the microphone signal preconditioning block includes calibration filters configured for compensation for acoustic variations due to manufacturing variability (e.g, of the microphone, of the system).

In some embodiments, the microphone signal preconditioning block 1102 is configured to receive microphone signals. For example, the microphone signal preconditioning block 1102 is configured to receive microphone signals (e.g., microphone signals 1108A-1108D) of the MR system. Each microphone signal may correspond to a microphone of the MR system. For example, microphone signal 1108A may correspond to microphone 608, microphone signal 1108B may correspond to microphone 604, microphone signal 1108C may correspond to microphone 602, and microphone signal 1108D may correspond to microphone 606.

In some embodiments, the microphone signal preconditioning block 1102 is also configured to receive speaker reference signals. For example, the microphone signal preconditioning block 1102 is configured to receive speaker reference signals 1110A and 1110B. The speaker reference signals may represent a magnitude and/or frequency response of a speaker of the MR system, and the speaker reference signals may be used for determining a contribution of the speakers to a recorded sound field (e.g., to determine a speaker's contribution to a captured sound field and remove the contribution). Each of the speaker reference signals may correspond to a speaker of the MR system. For example, speaker reference signal 1110A may correspond to speaker 220A, and speaker reference signal 1110B may correspond to speaker 220B.

In some embodiments, outputs of the microphone signal preconditioning block 1102 are transmitted to a beamforming block 1104. In some embodiments, the beamforming block 1104 is configured to receive the processed microphone signals (e.g., microphone signals after preconditioning) for beamforming. For example, as illustrated, the beamforming block 1104 receives steering parameters 1112. The steering parameters may include angle φ and angle θ. The angle φ and angle θ may correspond to the angle φ and angle θ described with respect to FIGS. 7-9. As discussed earlier, the microphone arrangement of the MR system advantageously allow more robust beamforming without adding additional microphones.

In some embodiments, the beamformed mic signal from the beamforming block 1104 is transmitted to block 1106. In some embodiments, the block 1106 is a post conditioning block. In some embodiments, the post conditioning block is configured to apply gain with soft clipping, apply tone EQ, function as an exciter or a de-esser, apply compression, perform automatic level control, perform other dynamics processing, perform noise reduction, and/or perform functions of a microphone channel strip. For example, the post conditioning block is configured to output a post conditioned stream. As another example, the post conditioning block is a voice stream post conditioning block configured to output a user voice stream (e.g., stored, processed to become an AR, MR, or XR environment recording).

In some embodiments, the block 1106 is a voice activity detection block. In some embodiments, the voice activity detection block is configured to detect for speech associated with a system command (e.g., wake up system, perform a command of the system). In some embodiments, the voice activity detection block outputs a voice activity flag 1116 corresponding to a detected voice activity (e.g., from the microphone signals). In some embodiments, the block 1106 is both a post conditioning block and a voice activity detection block, as illustrated. As discussed earlier, the microphone arrangement of the MR system advantageously allow more accurate user voice isolation (e.g., for more accurately capturing a user voice stream, for more accurately detecting voice activity) without adding additional microphones.

Figure 12:
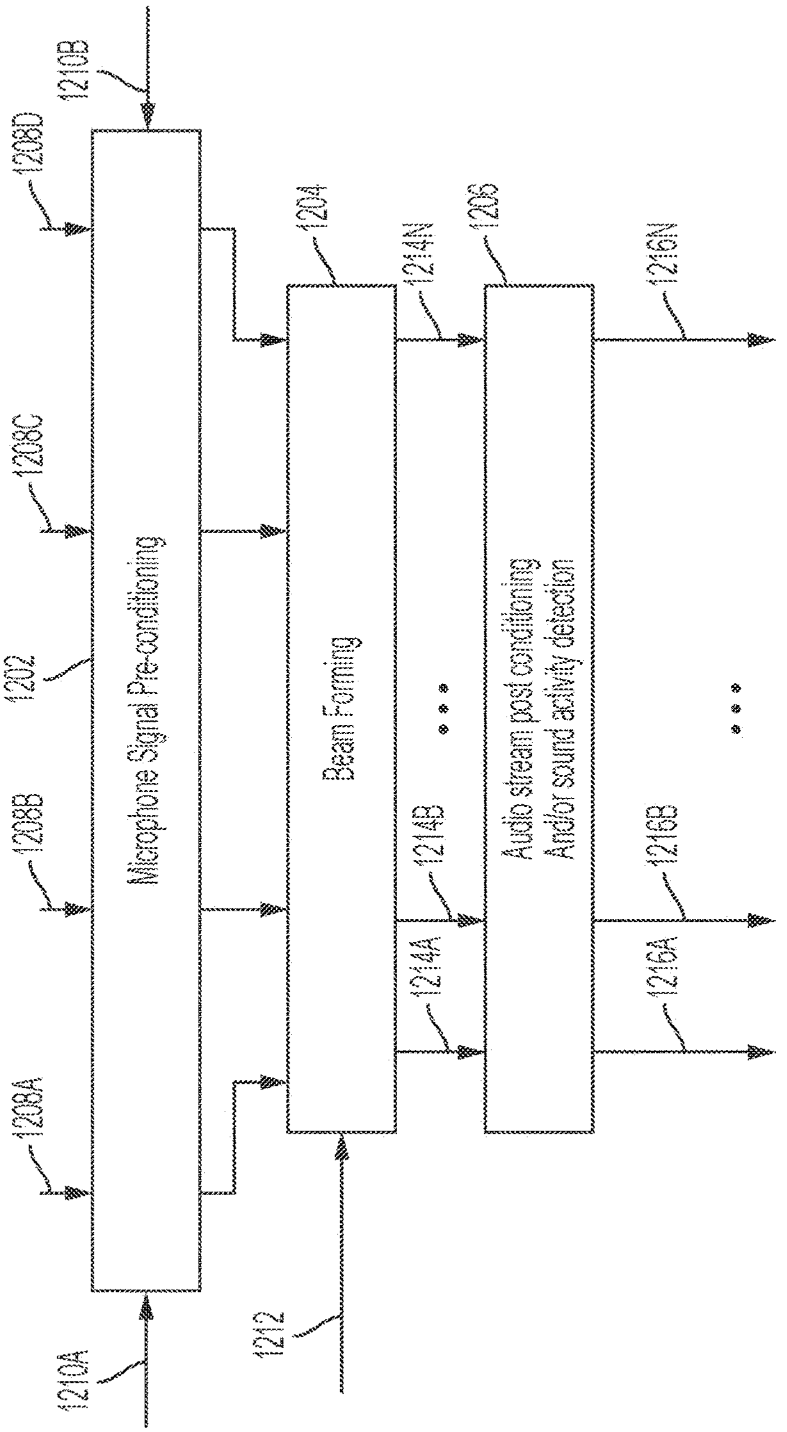
FIG. 12 illustrates an example diagram of a mixed reality system according to some embodiments of the disclosure.

FIG. 12 illustrates an example diagram 1200 of a MR system according to some embodiments of the disclosure. Although the diagram 1200 is illustrated as including the described components, it is understood that a different order of components, additional components, or fewer components may be included without departing from the scope of the disclosure. For example, components of diagram 1000 may be combined with components of other disclosed diagrams (e.g., diagram 1000, diagram 1100).

In some embodiments, some processes described with respect to diagram 1100 are performed with a first processor (e.g., a processor that consumes less power than the second processor, a first processor of a disclosed MR system), and some processes described with respect to diagram 1100 are performed with a second processor (e.g., a processor that has more processing power than the first processor, a second processor of a disclosed MR system). For example, processes performed with respect to the microphone signal preconditioning block may be performed with the first processor, and the remaining processes may be performed with the second processor. As another example, processes performed with respect to the microphone signal preconditioning block and beamforming block may be performed with the first processor, and the remaining processes may be performed with the second processor.

In some embodiments, the MR system includes microphone signal preconditioning block 1202. In some embodiments, the microphone signal preconditioning block 1202 comprises more than one block (e.g., one block per microphone signal). In some embodiments, the microphone signal preconditioning block 1202 is configured to process a microphone signal, adjust for a delay caused by the asymmetric microphone configuration, determine input power, smooth the microphone signal, calculate SNR, determine/remove speaker contribution to a captured sound field, and/or determine sounds of interest from the microphone signals.

In some embodiments, the microphone signal preconditioning block 1202 is configured to receive microphone signals. For example, the microphone signal preconditioning block 1202 is configured to receive microphone signals (e.g., microphone signals 1208A-1208D) of the MR system. Each microphone signal may correspond to a microphone of the MR system. For example, microphone signal 1208A may correspond to microphone 608, microphone signal 1208B may correspond to microphone 604, microphone signal 1208C may correspond to microphone 602, and microphone signal 1208D may correspond to microphone 606.

In some embodiments, the microphone signal preconditioning block 1202 is also configured to receive speaker reference signals. For example, the microphone signal preconditioning block 1202 is configured to receive speaker reference signals 1210A and 1210B. The speaker reference signals may represent a magnitude and/or frequency response of a speaker of the MR system, and the speaker reference signals may be used for determining a contribution of the speakers to a recorded sound field (e.g., to determine a speaker's contribution to a captured sound field and remove the contribution). Each of the speaker reference signals may correspond to a speaker of the MR system. For example, speaker reference signal 1210A may correspond to speaker 220A, and speaker reference signal 1210B may correspond to speaker 220B.

In some embodiments, outputs of the microphone signal preconditioning block 1202 are transmitted to a beamforming block 1204. In some embodiments, the beamforming block 1204 is configured to receive the processed microphone signals (e.g., microphone signals after preconditioning) for beamforming. For example, as illustrated, the beamforming block 1204 receives steering parameters 1212. The steering parameters may include angle $\varphi_n$ and angle $\theta_n$. The angle $\varphi$ and angle $\theta$ may correspond to the angle $\varphi$ and angle $\theta$ described with respect to FIGS. 7-9. In some embodiments, there are N pairs of angle $\varphi_n$ and angle $\theta_n$, and each pair of angles corresponds to a beamformed signal (e.g., one of beamformed signals 1214A to 1214N). As discussed earlier, the microphone arrangement of the MR system advantageously allow more robust beamforming without adding additional microphones.

In some embodiments, the beamformed mic signals from the beamforming block 1204 is transmitted to block 1206. For example, N beamformed signals 1214A to 1214N are outputted from the beamforming block 1204. In some embodiments, more than one of the N beamformed signals are outputted at a same time. In some embodiments, one of the N beamformed signals is outputted at a time.

In some embodiments, the block 1206 is a post conditioning block. In some embodiments, the post conditioning block is configured to to apply gain with soft clipping, apply tone EQ, function as an exciter or a de-esser, apply compression, perform automatic level control, perform other dynamics processing, perform noise reduction, and/or perform functions of a microphone channel strip. For example, the post conditioning block is configured to output a post conditioned stream. As another example, the post conditioning block is a voice stream post conditioning block configured to output a user voice stream (e.g., stored, processed to become an AR, MR, or XR environment recording). As a specific example, the post conditioning block receives a beamformed signal 1214N and outputs a user voice stream 1216N. The post conditioning block may be configured to receive N beamformed signals 1214A to 1214N and output N user voice streams 1216A to 1216N. In some embodiments, more than one of the N user voice streams are outputted at a same time. In some embodiments, one of the N user voice streams is outputted at a time.

In some embodiments, the block 1206 is a voice activity detection block. In some embodiments, the voice activity detection block is configured to detect for speech associated with a system command (e.g., wake up system, perform a command of the system). In some embodiments, the voice activity detection block outputs a voice activity flag corresponding to a detected voice activity (e.g., from the microphone signals). As a specific example, the voice activity detection block receives a beamformed signal 1214N and outputs a voice activity flag 1216N. The voice activity detection block may be configured to receive N beamformed signals 1214A to 1214N and output N voice activity flags 1216A to 1216N. In some embodiments, more than one of the N voice activity flags are outputted at a same time. In some embodiments, one of the N voice activity flags is outputted at a time.

In some embodiments, the block 1206 is both a post conditioning block and a voice activity detection block, as illustrated. As a specific example, the combined post conditioning and voice activity detection block receives a beamformed signal 1214N and outputs a user voice stream 1216N or a voice activity flag 1216N, depending on a desired type of output. The combined post conditioning and voice activity detection block may be configured to receive N beamformed signals 1214A to 1214N and output N user voice streams and voice activity flags 1216A to 1216N, each output signal depending on a desired type of output. In some embodiments, more than one of the N output signals are outputted at a same time. In some embodiments, one of the N output signals is outputted at a time.

As discussed earlier, the microphone arrangement of the MR system advantageously allow more accurate user voice isolation (e.g., for more accurately capturing a user voice stream, for more accurately detecting voice activity) without adding additional microphones.

Figure 13:
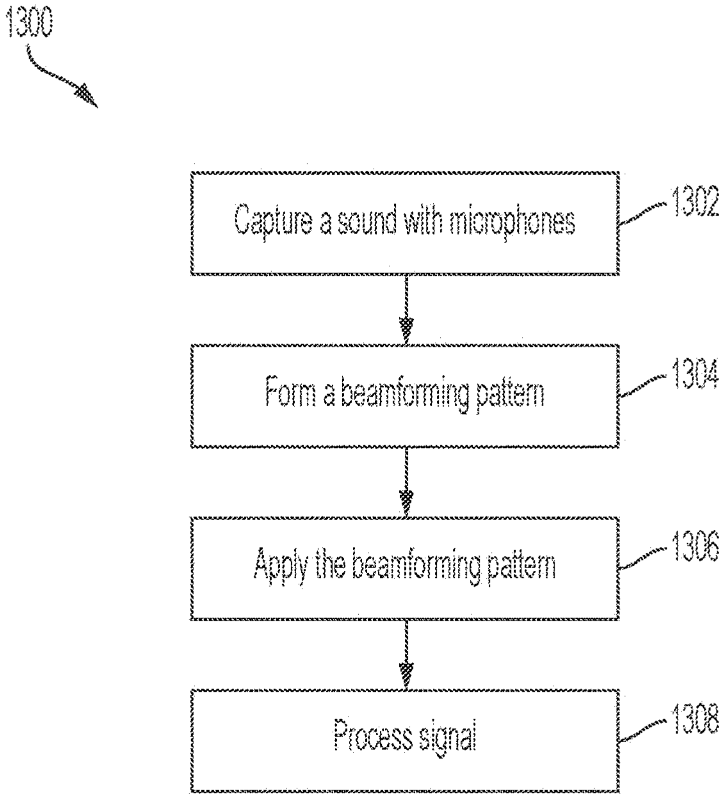
FIG. 13 illustrates an example method of operating a mixed reality system according to some embodiments of the disclosure.

FIG. 13 illustrates an example method 1300 of operating a MR system according to some embodiments of the disclosure. Although the method 1300 is illustrated as including the described steps, it is understood that a different order of steps, additional steps, or fewer steps may be included without departing from the scope of the disclosure.

In some embodiments, the method 1300 includes capturing a sound with microphones (step 1302). In some embodiments, the method 1300 includes capturing the sound with four microphones in the disclosed asymmetric configuration (e.g., three of the microphones are co-planar and the fourth microphone is not co-planar; without additional microphones), as described with respect to FIGS. 6-12. For the sake of brevity, some examples and advantages are not described herein. In some embodiments, the sound is a sound of an environment (e.g., an AR, MR, or XR environment) of a recording device.

In some embodiments, the method 1300 includes forming a beamforming pattern (step 1304). In some embodiments, the beamforming pattern comprises a location of the captured sound (e.g., from step 1302). In some embodiments, the beamforming pattern comprises a component that is not co-planar with a plane formed by three of the four microphones. For example, as described with respect to FIGS. 6-12, a beamforming pattern is formed based on the disclosed asymmetric configuration (e.g., three of the microphones are co-planar and the fourth microphone is not co-planar; without additional microphones). For the sake of brevity, some examples and advantages are not described herein.

In some embodiments, the method 1300 includes generating a first microphone signal based on the sound captured by a microphone of the first plurality of microphones and generating a second microphone signal based on the sound captured by the second microphone. In some embodiments, the method 1300 includes calculating a magnitude difference, a phase difference, or both between the first and second microphone signals; and based on the magnitude difference, the phase difference, or both, deriving a coordinate of the sound not co-planar with the plurality of microphones. For example, as described with respect to FIG. 6, a first microphone (e.g., a microphone of a plurality of co-planar microphones) generates a first microphone signal based on the captured sound, and the second microphone (e.g., a non-co-planar microphone) generates a second microphone signal based on the captured sound. Based on the amplitude and/or phase difference between the two microphone signals, a non-co-planar component may be derived by the wearable head device.

In some embodiments, the method 1300 includes applying the beamforming pattern (step 1306). For example, as described with respect to FIGS. 6-12, a beamforming pattern (e.g., based on the disclosed asymmetric configuration (e.g., three of the microphones are co-planar and the fourth microphone is not co-planar; without additional microphones)) is applied to capture a sound of interest at a location of the beamforming pattern to generate a beamformed signal. For the sake of brevity, some examples and advantages are not described herein.

In some embodiments, prior to applying the beamforming pattern, acoustic cancellation processing (e.g., using AEC blocks 1002A-1002D) is performed on the captured microphone signals (e.g., from step 1302), as described with respect to FIG. 10. In some embodiments, prior to applying the beamforming pattern, the captured microphone signals (e.g., from step 1302) are preconditioned (e.g., using microphone signal preconditioning block 1102 or 1202), as described with respect to FIGS. 11 and 12.

In some embodiments, the method 1300 includes processing a signal (step 1308). For example, a signal (e.g., a beamformed signal) is generated by applying a beamforming pattern (e.g., from step 1306, based on the disclosed asymmetric configuration (e.g., three of the microphones are co-planar and the fourth microphone is not co-planar; without additional microphones)) to the captured microphone signal (e.g., from step 1302), as described with respect to FIGS. 6-12. Examples of signal processing include reducing a noise level in the signal, performing post conditioning on the signal, detecting a voice activity in the signal, generating a speaker signal for acoustic cancellation, analyzing an audio scene associated with the captured sound, and compensating for a movement of the recording device. For the sake of brevity, some examples and advantages are not described herein.

In some embodiments, a wearable head device (e.g., a wearable head device described herein, AR/MR/XR system described herein) includes: a processor; a memory; and a program stored in the memory, configured to be executed by the processor, and including instructions for performing the methods described with respect to FIGS. 6-13.

In some embodiments, a non-transitory computer readable storage medium stores one or more programs, and the one or more programs includes instructions. When the instructions are executed by an electronic device (e.g., an electronic device or system described herein) with one or more processors and memory, the instructions cause the electronic device to perform the methods described with respect to FIGS. 6-13.

Although examples of the disclosure are described with respect to a wearable head device or an AR/MR/XR system, it is understood that the disclosed sound field recording and playback methods may also be performed using other devices or systems. For example, the disclosed methods may be performed using a mobile device for compensating for effects of movement during recording or playback. As another example, the disclosed methods may be performed using a mobile device for recording a sound field including extracting sound objects and combining the sound objects and a residual.

Although examples of the disclosure are described with respect to headpose compensation, it is understood that the disclosed sound field recording and playback methods may also be performed generally for compensation of any movement. For example, the disclosed methods may be performed using a mobile device for compensating for effects of movement during recording or playback.

With respect to the systems and methods described herein, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described herein. For example, a first computer processor (e.g., a processor of a wearable device coupled to one or more microphones) can be utilized to receive input microphone signals, and perform initial processing of those signals (e.g., signal conditioning and/or segmentation). A second (and perhaps more computationally powerful) processor can then be utilized to perform more computationally intensive processing, such as determining probability values associated with speech segments of those signals. Another computer device, such as a cloud server, can host an audio processing engine, to which input signals are ultimately provided. Other suitable configurations will be apparent and are within the scope of the disclosure.

According to some embodiments, a wearable head device comprises: a first plurality of microphones, wherein the first plurality of microphones are co-planar; a second microphone, wherein the second microphone is not co-planar with the plurality of microphones; and one or more processors configured to perform: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

According to some embodiments, a number of the first plurality of microphones is three.

According to some embodiments, the beamforming pattern comprises a radial component, an azimuthal angle component, and a non-zero polar angle component.

According to some embodiments, the beamforming pattern comprises at least one of cardioid, hypercardioid, supercardioid, dipole, bipolar, and shotgun shapes.

According to some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

According to some embodiments, the one or more processors are configured to further perform preconditioning the signal of the captured sound.

According to some embodiments, one of the first plurality of microphones and the second microphone are located on a front of the wearable head device.

According to some embodiments, the beamforming pattern does not include a location of a second sound on a plane co-planar with the first plurality of microphones.

According to some embodiments, a microphone of the first plurality of microphones is located proximal to an ear location.

According to some embodiments, the one or more processors are configured to further perform: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

According to some embodiments, a method of operating a wearable head device comprising: a first plurality of microphones, wherein the first plurality of microphones are co-planar; and a second microphone, wherein the second microphone is not co-planar with the plurality of microphones, the method comprising: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

According to some embodiments, a number of the first plurality of microphones is three.

According to some embodiments, the beamforming pattern comprises a radial component, an azimuthal angle component, and a non-zero polar angle component.

According to some embodiments, the beamforming pattern comprises at least one of cardioid, hypercardioid, supercardioid, dipole, bipolar, and shotgun shapes.

According to some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

According to some embodiments, the method further comprises performing preconditioning the signal of the captured sound.

According to some embodiments, one of the first plurality of microphones and the second microphone are located on a front of the wearable head device.

According to some embodiments, the beamforming pattern does not include a location of a second sound on a plane co-planar with the first plurality of microphones.

According to some embodiments, a microphone of the first plurality of microphones is located proximal to an ear location.

According to some embodiments, the method further comprises: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

According to some embodiments, a non-transitory computer-readable medium storing one or more instructions, which, when executed by one or more processors of an electronic device comprising: a first plurality of microphones, wherein the first plurality of microphones are co-planar; and a second microphone, wherein the second microphone is not co-planar with the plurality of microphones, cause the device to perform a method comprising: capturing, with the microphones, a sound of an environment; forming a beamforming pattern, wherein: the beamforming pattern comprises a location of the sound of the environment, and the beamforming pattern comprises a component that is not co-planar with the plurality of microphones; applying the beamforming pattern on a signal of the captured sound to generate a beamformed signal; and processing the beamformed signal.

According to some embodiments, a number of the first plurality of microphones is three.

According to some embodiments, the beamforming pattern comprises a radial component, an azimuthal angle component, and a non-zero polar angle component.

According to some embodiments, the beamforming pattern comprises at least one of cardioid, hypercardioid, supercardioid, dipole, bipolar, and shotgun shapes.

According to some embodiments, processing the beamformed signal comprises at least one of: reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

According to some embodiments, the method further comprises performing preconditioning the signal of the captured sound.

According to some embodiments, one of the first plurality of microphones and the second microphone are located on a front of the wearable head device.

According to some embodiments, the beamforming pattern does not include a location of a second sound on a plane co-planar with the first plurality of microphones.

According to some embodiments, a microphone of the first plurality of microphones is located proximal to an ear location.

According to some embodiments, the method further comprises: generating a first microphone signal based on the sound captured by a microphone of the first plurality of microphones; generating a second microphone signal based on the sound captured by the second microphone; calculating a magnitude difference, a phase difference, or both between the first and second microphone signals; and based on the magnitude difference, the phase difference, or both, deriving a coordinate of the sound not co-planar with the plurality of microphones.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A wearable head device, comprising:

a plurality of first microphones, wherein the plurality of first microphones is co-planar;

a second microphone, wherein the second microphone is not co-planar with the plurality of first microphones; and one or more processors configured to perform:

capturing, with the first microphones and the second microphone, a sound of an environment;

forming a beamforming pattern, wherein:

the beamforming pattern comprises a location of the sound of the environment, and the beamforming pattern comprises a component that is not co-planar with the plurality of first microphones;

applying the beamforming pattern on a signal of the captured sound to generate a beamformed signal; and processing the beamformed signal, wherein the one or more processors are configured to further perform:

generating a first microphone signal based on the sound captured by a microphone of the plurality of first microphones;

generating a second microphone signal based on the sound captured by the second microphone;

calculating a magnitude difference, a phase difference, or both between the first and second microphone signals; and based on the magnitude difference, the phase difference, or both, deriving a coordinate of the sound not co-planar with the plurality of first microphones.

2. The wearable head device of claim 1, wherein a number of the plurality of first microphones is three.

3. The wearable head device of claim 1, wherein the beamforming pattern comprises a radial component, an azimuthal angle component, and a non-zero polar angle component.

4. The wearable head device of claim 1, wherein the beamforming pattern comprises at least one of cardioid, hypercardioid, supercardioid, dipole, bipolar, and shotgun shapes.

5. The wearable head device of claim 1, wherein the processing the beamformed signal comprises at least one of:

reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

6. The wearable head device of claim 1, wherein the one or more processors are configured to further perform pre-conditioning the signal of the captured sound.

7. The wearable head device of claim 1, wherein one of the plurality of first microphones and the second microphone are located on a front of the wearable head device.

8. The wearable head device of claim 1, wherein the beamforming pattern does not include a location of a second sound on a plane co-planar with the plurality of first microphones.

9. The wearable head device of claim 1, wherein a microphone of the plurality of first microphones is located proximal to an ear location.

10. A method of operating a wearable head device, comprising:

capturing, with a plurality of first microphones and a second microphone, a sound of an environment, wherein:

the plurality of first microphones is co-planar, and the second microphone is not co-planar with the plurality of first microphones;

forming a beamforming pattern, wherein:

the beamforming pattern comprises a location of the sound of the environment, and the beamforming pattern comprises a component that is not co-planar with the plurality of first microphones;

applying the beamforming pattern on a signal of the captured sound to generate a beamformed signal;

processing the beamformed signal; and generating a first microphone signal based on the sound captured by a microphone of the plurality of first microphones;

generating a second microphone signal based on the sound captured by the second microphone;

calculating a magnitude difference, a phase difference, or both between the first and second microphone signals; and based on the magnitude difference, the phase difference, or both, deriving a coordinate of the sound not co-planar with the plurality of first microphones.

11. A non-transitory computer-readable medium storing one or more instructions, which, when executed by one or more processors of a wearable head device, cause the wearable head device to perform a method comprising:

capturing, with a plurality of first microphones and a second microphone, a sound of an environment, wherein:

the plurality of first microphones is co-planar, and the second microphone is not co-planar with the plurality of first microphones;

forming a beamforming pattern, wherein:

the beamforming pattern comprises a location of the sound of the environment, and the beamforming pattern comprises a component that is not co-planar with the plurality of first microphones;

applying the beamforming pattern on a signal of the captured sound to generate a beamformed signal;

processing the beamformed signal;

generating a first microphone signal based on the sound captured by a microphone of the plurality of first microphones;

generating a second microphone signal based on the sound captured by the second microphone;

calculating a magnitude difference, a phase difference, or both between the first and second microphone signals; and based on the magnitude difference, the phase difference, or both, deriving a coordinate of the sound not co-planar with the plurality of first microphones.

12. The method of claim 10, wherein the beamforming pattern comprises a radial component, an azimuthal angle component, and a non-zero polar angle component.

13. The method of claim 10, wherein the beamforming pattern comprises at least one of cardioid, hypercardioid, supercardioid, dipole, bipolar, and shotgun shapes.

14. The method of claim 10, wherein the processing the beamformed signal comprises at least one of:

reducing a noise level in the signal, performing post conditioning on the signal, detecting a voice activity in the signal, generating a speaker signal for acoustic cancellation, analyzing an audio scene associated with the captured sound, and compensating for a movement of the wearable head device.

15. The method of claim 10, further comprising preconditioning the signal of the captured sound.

16. The method of claim 10, wherein one of the plurality of first microphones and the second microphone are located on a front of the wearable head device.

17. The method of claim 10, wherein the beamforming pattern does not include a location of a second sound on a plane co-planar with the plurality of first microphones.

18. The method of claim 10, wherein a microphone of the plurality of first microphones is located proximal to an ear location.

* * * * *